(12) United States Patent
Bailey et al.

(10) Patent No.: US 8,620,361 B2
(45) Date of Patent: Dec. 31, 2013

(54) INTELLIGENT ROUTING OF SMS AND MMS MESSAGES TO SHORT CODES

(75) Inventors: Matthew Bailey, Seattle, WA (US); Chris Bryant, Duvall, WA (US); William Rosenberg, Austin, TX (US)

(73) Assignee: AT&T Mobility II LLC, Atlanta, GA (US)

(*) Notice: Subject to any disclaimer, the term of this patent is extended or adjusted under 35 U.S.C. 154(b) by 414 days.

(21) Appl. No.: 12/633,492

(22) Filed: Dec. 8, 2009

(65) Prior Publication Data
US 2011/0136519 A1    Jun. 9, 2011

(51) Int. Cl.
*H04W 4/00*    (2009.01)

(52) U.S. Cl.
USPC .............. 455/466; 455/412.1; 455/414.4; 455/461; 455/519

(58) Field of Classification Search
USPC .......... 455/466, 412.1, 414.4, 519, 461, 445, 455/518; 379/221.13
See application file for complete search history.

(56) References Cited

U.S. PATENT DOCUMENTS

| 2002/0137530 A1* | 9/2002 | Karve ........................... 455/466 |
| 2004/0057403 A1* | 3/2004 | Jerbi et al. .................... 370/329 |
| 2007/0275738 A1 | 11/2007 | Hewes et al. |
| 2009/0061825 A1 | 3/2009 | Neelakantan et al. |
| 2009/0111492 A1* | 4/2009 | Dudley et al. ................. 455/466 |
| 2009/0203390 A1 | 8/2009 | Bradbury et al. |
| 2009/0316692 A1* | 12/2009 | Trapp et al. ................... 370/352 |
| 2011/0070890 A1 | 3/2011 | Wu |

FOREIGN PATENT DOCUMENTS

KR    2006110852 A    10/2006

OTHER PUBLICATIONS

"What is a Common Short Code (CSC)?", © 2009 CTIA—The Wireless Association®, 4 pages.
OA dated Jul. 3, 2012 for U.S. Appl. No. 12/634,201, 28 pages.

* cited by examiner

*Primary Examiner* — Marcos Torres
(74) *Attorney, Agent, or Firm* — Turocy & Watson, LLP

(57) ABSTRACT

Systems, methods, and apparatus that facilitate effective routing of short message service (SMS) and multimedia messaging service (MMS) messages via short codes are presented herein. A group message component can be configured to receive a message transmitted via a wireless communications device, and determine whether the message comprises at least two addressees. A short code component can be configured to identify whether the at least two addressees are associated with at least one short code, and recognize whether the message comprises only text. A routing component can be configured to convert the message to an SMS message when the message comprises the at least two addressees, the at least two addressees are associated with the at least one short code, and the message comprises only text. Further, the routing component can be configured to route the SMS message to the at least one short code.

20 Claims, 24 Drawing Sheets

INTELLIGENT ROUTING OF SMS AND MMS MESSAGES TO SHORT CODES

TECHNICAL FIELD

This disclosure relates generally to intelligent routing of short message service (SMS) and multimedia messaging service (MMS) messages to short codes.

BACKGROUND

SMS based communication services enable sharing of text-only messages between mobile devices, such messages including up to 160 characters. MMS based communication services extend SMS capability by enabling inclusion of multimedia content, e.g., photographs, in messages sent between mobile devices. Moreover, MMS based technology facilitates group, or multiple recipient, messaging. In group messaging, a message can be sent, or broadcast, to more than one addressee; when an addressee responds, or replies, to the message, the response is broadcast to all addressees/recipients of the message.

Short codes are short telephone numbers that can be used to address SMS and MMS messages from communication devices, and are designed to be easier to read and remember than normal, e.g., North American Numbering Plan Administration (NANPA) telephone numbers—NANPA telephone numbers are ten-digit numbers consisting of a tree-digit Numbering Plan Area (NPA) code (or area code), followed by a seven-digit local number. Messages can be sent to short codes, for example, to enter votes during a television broadcast, to order ringtones, or to implement various mobile device services, e.g., to verify total minutes used per cellular phone service period. Although conventional MMS techniques can route SMS and MMS messages via short codes, such techniques can limit customer experience(s) by incorrectly routing text-only, short code addressed group messages via MMS protocol.

The above-described deficiencies of today's wireless communication networks and related technologies are merely intended to provide an overview of some of the problems of conventional systems, and are not intended to be exhaustive. Other problems with the state of the art, and corresponding benefits of some of the various non-limiting embodiments described herein, may become further apparent upon review of the following detailed description.

SUMMARY

The following presents a simplified summary to provide a basic understanding of some aspects described herein. This summary is not an extensive overview of the disclosed subject matter. It is not intended to identify key or critical elements of the disclosed subject matter or delineate the scope of the subject innovations. Its sole purpose is to present some concepts of the disclosed subject matter in a simplified form as a prelude to the more detailed description presented later.

The subject disclosure relates to systems, methods, and apparatus that effectively route SMS and MMS messages via short codes. Conventional group messaging techniques can reduce customer satisfaction by incorrectly routing text-only, short code addressed multiple recipient messages via MMS protocol. Compared to such techniques, various systems, methods, and apparatus described herein utilize SMS protocol to route multiple recipient, short code addressed text-only messages within a group messaging environment.

Aspects, features, and/or advantages of the disclosed subject matter can be exploited in substantially any wireless telecommunication or radio technology, e.g., wireless fidelity (Wi-Fi™); Worldwide Interoperability for Microwave Access (WiMAX™); Enhanced General Packet Radio Service (Enhanced GPRS); Third Generation Partnership Project (3GPP) Long Term Evolution (LTE™); Third Generation Partnership Project 2 (3GPP2); Ultra Mobile Broadband (UMB); 3GPP Universal Mobile Telecommunication System (UMTS); High Speed Packet Access (HSPA); High Speed Downlink Packet Access (HSDPA); High Speed Uplink Packet Access (HSUPA); LTE™ Advanced (LTE-A), Global System for Mobile Communication (GSM), etc.

Additionally, one or more embodiments described herein can include legacy telecommunication technologies, e.g., plain old telephone service (POTS). Further, selections of a radio technology can include second generation (2G), third generation (3G), and fourth generation (4G) evolution of the radio technology; however, such selections are not intended as a limitation of the disclosed subject matter and related aspects thereof. In addition, aspects, features, and/or advantages of the disclosed subject matter can be exploited in disparate electromagnetic frequency bands. Moreover, one or more embodiments described herein can be executed in one or more network elements, such as a mobile wireless device, e.g., user equipment (UE), and/or within one or more elements of a network infrastructure, e.g., radio network controller.

The following description and the annexed drawings set forth in detail certain illustrative aspects of the disclosed subject matter. These aspects are indicative, however, of but a few of the various ways in which the principles of the innovation may be employed. The disclosed subject matter is intended to include all such aspects and their equivalents. Other advantages and distinctive features of the disclosed subject matter will become apparent from the following detailed description of the innovation when considered in conjunction with the drawings.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
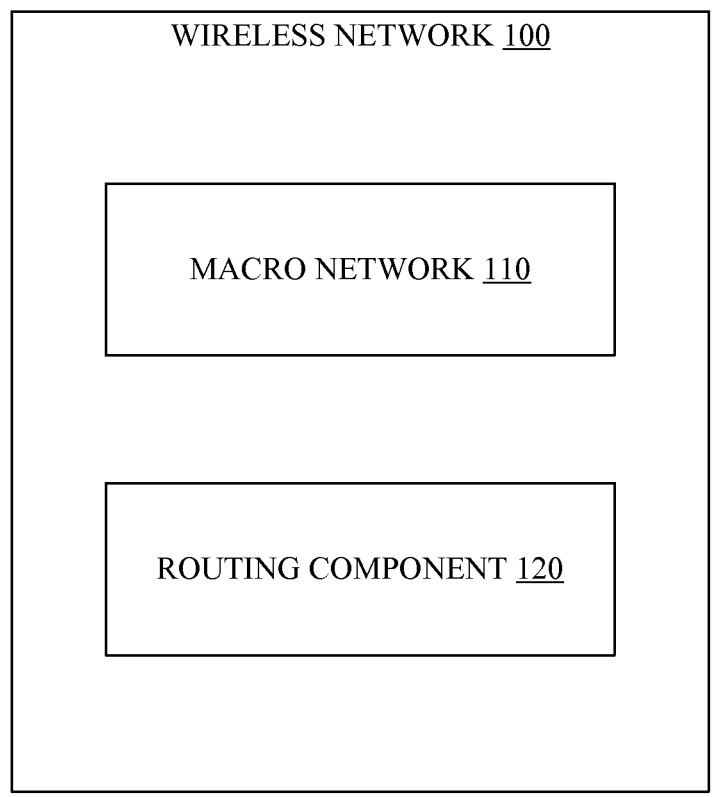
FIG. 1 illustrates a wireless network including a routing component for intelligently routing SMS and MMS messages to short codes, in accordance with an embodiment.

Various non-limiting embodiments of systems, methods, and apparatus are provided for intelligently routing SMS and MMS short code addressed text-only messages within a group messaging environment.

In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment. Thus, the appearances of the phrase "in one embodiment" or "in an embodiment" in various places throughout this specification are not necessarily all referring to the same embodiment. Furthermore, the particular features, structures, or characteristics may be combined in any suitable manner in one or more embodiments.

As utilized herein, terms "component," "system," "platform," "node," "layer," "selector," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various computer readable media having various data structures stored thereon. The components can communicate via local and/or remote processes such as in accordance with a signal having one or more data packets (e.g., data from one component interacting with another component in a local system, distributed system, and/or across a network, e.g., the Internet, with other systems via the signal). As another example, a component can be an apparatus with specific functionality provided by mechanical parts operated by electric or electronic circuitry; the electric or electronic circuitry can be operated by a software application or a firmware application executed by a processor; the processor can be internal or external to the apparatus and can execute at least a part of the software or firmware application. As yet another example, a component can be an apparatus that provides specific functionality through electronic components without mechanical parts; the electronic components can include a processor therein to execute software and/or firmware that confer(s) at least in part the functionality of the electronic components.

The word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

Artificial intelligence based systems, e.g., utilizing explicitly and/or implicitly trained classifiers, can be employed in connection with performing inference and/or probabilistic determinations and/or statistical-based determinations as in accordance with one or more aspects of the disclosed subject matter as described herein. For example, an artificial intelligence system can be used, via routing component 230 (described below) to automatically route group directed, text-only messages as non-group messages via an SMS protocol. In another example, the artificial intelligence system can be used, via system 1200 (described below) to automatically: determine whether at least two addressees of a message transmitted by a wireless communications device are associated with at least one non-short code telephone number and at least one short code; request a confirmation via the wireless communications device to route the message to one or more of the at least two addressees that are not associated with the at least one short code; and route the message to the one or more of the at least two addressees via an MMS protocol—based on a received confirmation.

As used herein, the term "infer" or "inference" refers generally to the process of reasoning about or inferring states of the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example. Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, magnetic storage devices, e.g., hard disk; floppy disk; magnetic strip(s); optical disk (e.g., compact disk (CD), digital video disc (DVD), Blu-ray Disc™ (BD)); smart card(s); and flash memory device(s) (e.g., card, stick, key drive).

Moreover, terms like "user equipment" (UE), "mobile station," "mobile subscriber station," "access terminal," "terminal," "handset," "appliance," "machine", and similar terminology refer to a wireless device utilized by a subscriber or user of a wireless communication service to receive and/or convey data associated with voice, video, sound, and/or substantially any data-stream or signaling-stream. Further, the foregoing terms are utilized interchangeably in the subject specification and related drawings. Likewise, the terms "local wireless communications cite," "access point" (AP), "base station," "Node B," "evolved Node B," "home Node B" (HNB), "home access point" (HAP), and the like are utilized interchangeably in the subject specification and drawings and refer to a wireless network component or apparatus that sends and/or receives data associated with voice, video, sound, and/or substantially any data-stream or signaling-stream between a set of subscriber stations—unless context warrants particular distinction(s) among the terms. Further, the data and signaling streams can be packetized or frame-based flows.

Furthermore, the terms "user," "subscriber," "customer," "consumer," "agent,", "owner," and the like are employed interchangeably throughout the subject specification and related drawings, unless context warrants particular distinction(s) among the terms. It should be appreciated that such terms can refer to human entities, or automated components supported through artificial intelligence, e.g., a capacity to make inference based on complex mathematical formalisms, that can provide simulated vision, sound recognition, decision making, etc. Also, the terms "local wireless communications cite," "access point," "base station," and the like are utilized interchangeably throughout the subject specification, and refer to devices that can receive and transmit signal(s) from and to wireless devices through one or more antennas. In addition, the terms "wireless network" and "network" are used interchangeable in the subject application, unless context warrants particular distinction(s) among the terms.

The subject disclosure relates to systems, methods, and apparatus that route short code addressed, text-only, group messages as non-group SMS-based messages within a wireless network. In one aspect, the wireless network can include a local wireless communications cite (or base station), which can use a licensed radio spectrum operated and controlled by a wireless service provider. UE operated by a subscriber within a coverage area typically communicates with a core network via the base station. Further, UE can register with the base station and communication, e.g., voice traffic, data traffic, etc. can be routed to the subscriber through the base station utilizing the licensed radio spectrum. The base station can employ a backhaul network, e.g., broadband wired or wireless network backbone, to route packet communication, e.g., voice traffic, data traffic, etc. to the core network.

FIG. 1 illustrates a wireless network 100 including a routing component 120 for intelligently routing SMS and MMS messages to short codes, in accordance with an embodiment. Wireless network 100 can further include a macro network 110, which can include at least one base station (not shown) that serves at least one mobile wireless device (or UE) (not shown) in outdoor locations via a macro cell (not shown). The term "macro cell" generally refers to a coverage area, or geographical area, having a radius of at least one kilometer. The terms "microcell," "picocell," and "femtocell" generally refer to progressively smaller sized coverage areas, which can additionally serve the at least one mobile wireless device, e.g., in indoor locations.

While aspects and/or features of the subject disclosure are illustrated in relation to macro cells, such aspects and/or features are also applicable to, and can be implemented in: a microcell, or microcell access point; a picocell, or picocell access point; a femtocell, or femtocell access point; a Wi-Fi™ access point; a WiMAX™ access point, a Bluetooth™ access point, other wireless-based access points; or the like. Further, macro network 110 can include a core network (not shown) comprising one or more cellular technologies, e.g., 3GPP UMTS, GSM, etc. Each base station, or access point, of macro network 110 can communicate with the core network via a wired backbone link (not shown), e.g., optical fiber, twisted-pair, coaxial cable, etc.

As described above, MMS-based communication services extend SMS capability by enabling group, or multiple recipient, messaging. In group messaging, a message can be sent to at least two addressees, and a response, or reply, to the message can be sent to the at least two addressees; thus, when text-only group messages are received within a wireless network, such messages utilize an MMS protocol. Conventional techniques cannot deliver text-only group messages to non-MMS-based endpoints and/or to SMS-based service providers via MMS protocol. For example, a text-only message routed to a short code via MMS protocol will fail to reach an endpoint/destination associated with the short code. To correct for these and other drawbacks of conventional techniques, routing component 120 can improve customer experience(s) within a group messaging environment by routing group addressed, text-only messages as non-group messages via an SMS protocol.

It should be appreciated that although routing component 120 is illustrated in FIG. 1 as an entity distinct from macro network 110, routing component 120 can be located/included within and/or across one or more components, e.g., hardware, software, etc., of wireless network 100, e.g., within or among hardware and/or software of components of macro network 110.

Figure 2:
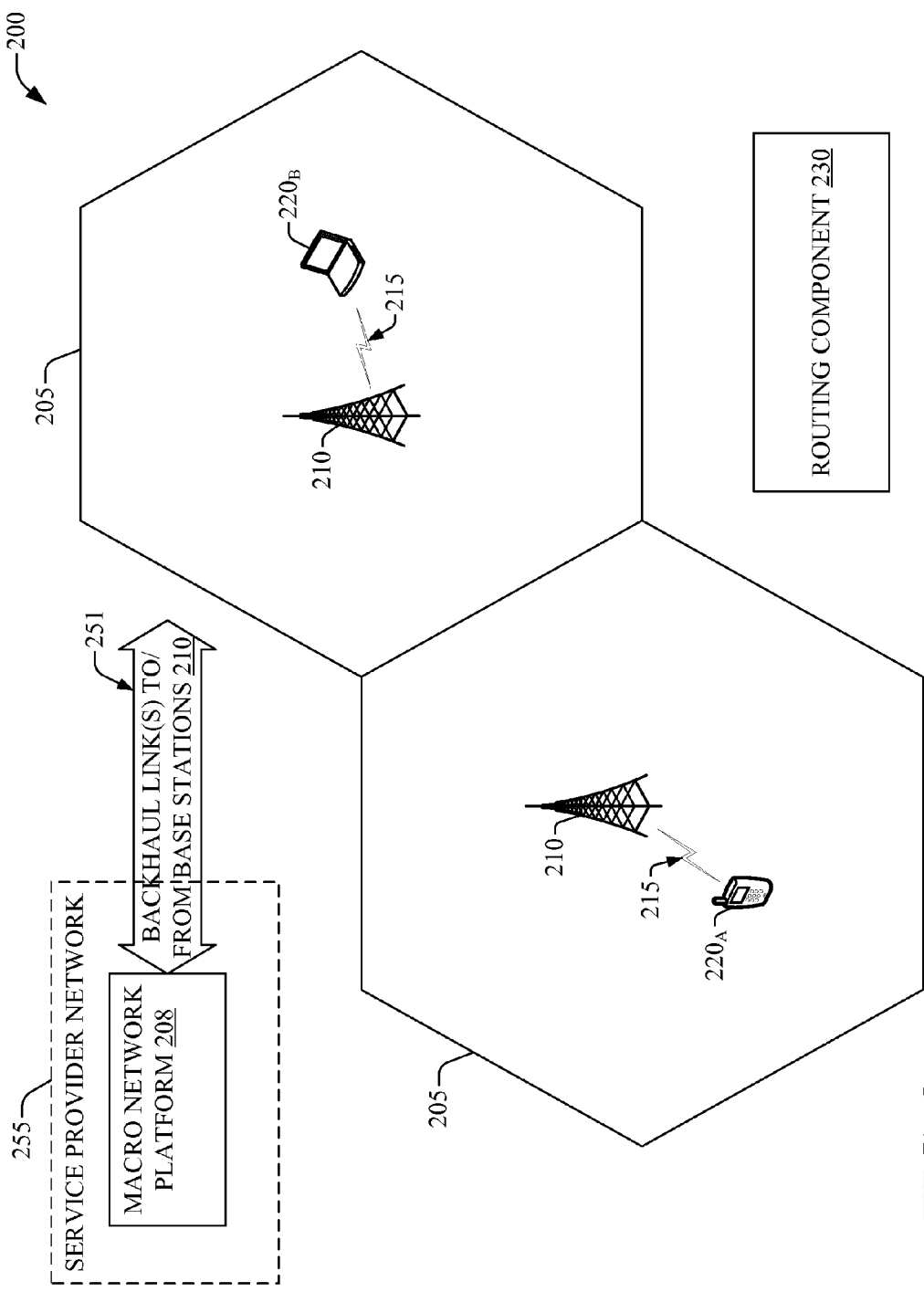
FIG. 2 illustrates a wireless environment including a routing component for effectively routing SMS and MMS messages to short codes, in accordance with an embodiment.

FIG. 2 illustrates a wireless environment 200 including a routing component 230 for effectively routing SMS and MMS messages to short codes, in accordance with an embodiment. Wireless environment 200 can further include macro cells 205 and base stations 210 for wireless coverage. Each macro cell 205 represents a "macro" cell coverage area, or sector, served by a base station 210. It should be appreciated that although macro cells 205 are illustrated as hexagons, macro cells 205 can adopt other geometries generally dictated by a deployment or topography of the macro cell coverage area, or covered geographic area, e.g., metropolitan statistical area (MSA), rural statistical area (RSA), etc. Macro cell coverage is generally intended to serve mobile wireless devices, e.g., mobile wireless device $220_A$, mobile wireless device $220_B$, in outdoor locations. An over-the-air wireless link 215 provides the macro coverage, and wireless link 215 comprises a downlink (DL) and an uplink (UL) (both not shown) that can utilize a predetermined band of radio frequency (RF) spectrum associated with, e.g., GSM, 3GPP UMTS. Accordingly, mobile wireless device $220_A$ can be a GSM and/or 3GPP UMTS mobile phone, while $220_B$ can be a remote computing device with GSM and/or 3GPP UMTS capabilities.

Base station 210—including associated electronics, circuitry and/or components—and wireless link 215 form a radio network, e.g., base station subsystem (BSS) associated with a GSM wireless network, or radio access network (RAN) associated with a UMTS wireless network. In addition, base station 210 communicates with macro network platform 208 via backhaul link(s) 251. Macro network platform 208 represents a core network comprising one or more cellular wireless technologies, e.g., 3GPP UMTS or GSM. In one aspect, macro network platform 208 controls a set of base stations 210 that serve either respective cells or a number of sectors within such cells. Macro network platform 208 can also communicate with other base stations (not shown) that serve other cells (not shown). Backhaul link(s) 251 can include a wired backbone link, e.g., optical fiber backbone, twisted-pair line, T1/E1 phone line, synchronous or asynchronous digital subscriber line (DSL), asymmetric DSL (ADSL), coaxial cable, etc. Moreover, backhaul links(s) 251 can link disparate base stations 210 based on macro network platform 208.

Packet communication, e.g., voice traffic, data traffic, is typically routed through a broadband wired network backbone (or backhaul network) utilizing, e.g., optical fiber backbone, twisted-pair line, T1/E1 phone line, synchronous or asynchronous digital subscriber line (DSL), asymmetric DSL (ADSL), coaxial cable, etc. To this end, base station 210 is typically connected to the backhaul network, e.g., service provider network 255, via a broadband modem (not shown) and backhaul link(s) 251. Through backhaul link(s) 251, base station 210 can handle substantially any quality of service (QoS) for heterogeneous packetized traffic, e.g., various multiple packet flows.

Further, base station 210 can integrate into an existing network, e.g., GSM or 3GPP network, via various interfaces, for example: via an A-bis interface (not shown) between a base transceiver station (BTS) and a base station controller (BSC); via an Iub interface (not shown) between a radio network controller (RNC) and base station 210; via an interface (not shown) between an RNC and a Circuit Switched Core Network (CS-CN); via an interface (not shown) between an RNC and an Iu-CS interface; via an interface (not shown) between an RNC and a Packet Switched Core Network (or Iu-PS interface); via an interface (not shown) between a BSC and a mobile switching center (MSC) and/or Network Switching Subsystem (NNS); via an interface (not shown) between a Serving General Packet Radio Service Support Node (SGSN) and a public data network (PDN) (or Gi interface); via an interface (not shown) between an SGSN and other SGSNs (or Gn interface).

In an aspect (not shown), wireless environment 200 can include a Short Message Service Center (SMSC) that can store an SMS message until a destination mobile wireless device, e.g., $220_A$ and/or $220_B$, can receive the SMS message, e.g., between voice calls. In another aspect (not shown), wireless environment 200 can include a Gateway Mobile Switching Center (GMSC) that can receive the SMS message from the SMSC, determine subscriber call routing information, and deliver the SMS message to the destination mobile wireless device via an MSC (see above). The MSC can maintain subscriber records and call routing information within databases, such as a Home Location Register (HLR) and a Visitor Location Register (VLR), and can coordinate and control call setup and routing of the SMS message to the destination mobile wireless device.

As described above, conventional group messaging techniques can fail to deliver text-only messages received via an MMS protocol when the text-only messages are addressed to short codes. Accordingly, routing component 230 can improve customer experience(s) within a group messaging, wireless environment by routing group directed, text-only messages as non-group messages via an SMS protocol, e.g., via an SMSC.

It should be appreciated that although routing component 230 is illustrated in FIG. 2 as an entity distinct from, e.g., base stations 210, mobile wireless devices $220_A$ and $220_B$, service provider network 225, etc., aspects and/or features of routing component 230 can be located/included within and/or across one or more components, e.g., hardware, software, etc., of wireless network 200. For example, in one embodiment, routing component 230 can be located within any component(s) of a GSM and/or UMTS core network, e.g. service provider network 255. In another embodiment, routing component 230 can be located in hardware and/or software of base stations 210 and/or mobile wireless devices $220_A$ and $220_B$. Moreover, it should be appreciated that features and advantages of the subject innovation can be implemented in microcells, picocells, femtocells, or the like, wherein base station 210 can be embodied in an access point.

Figure 3:
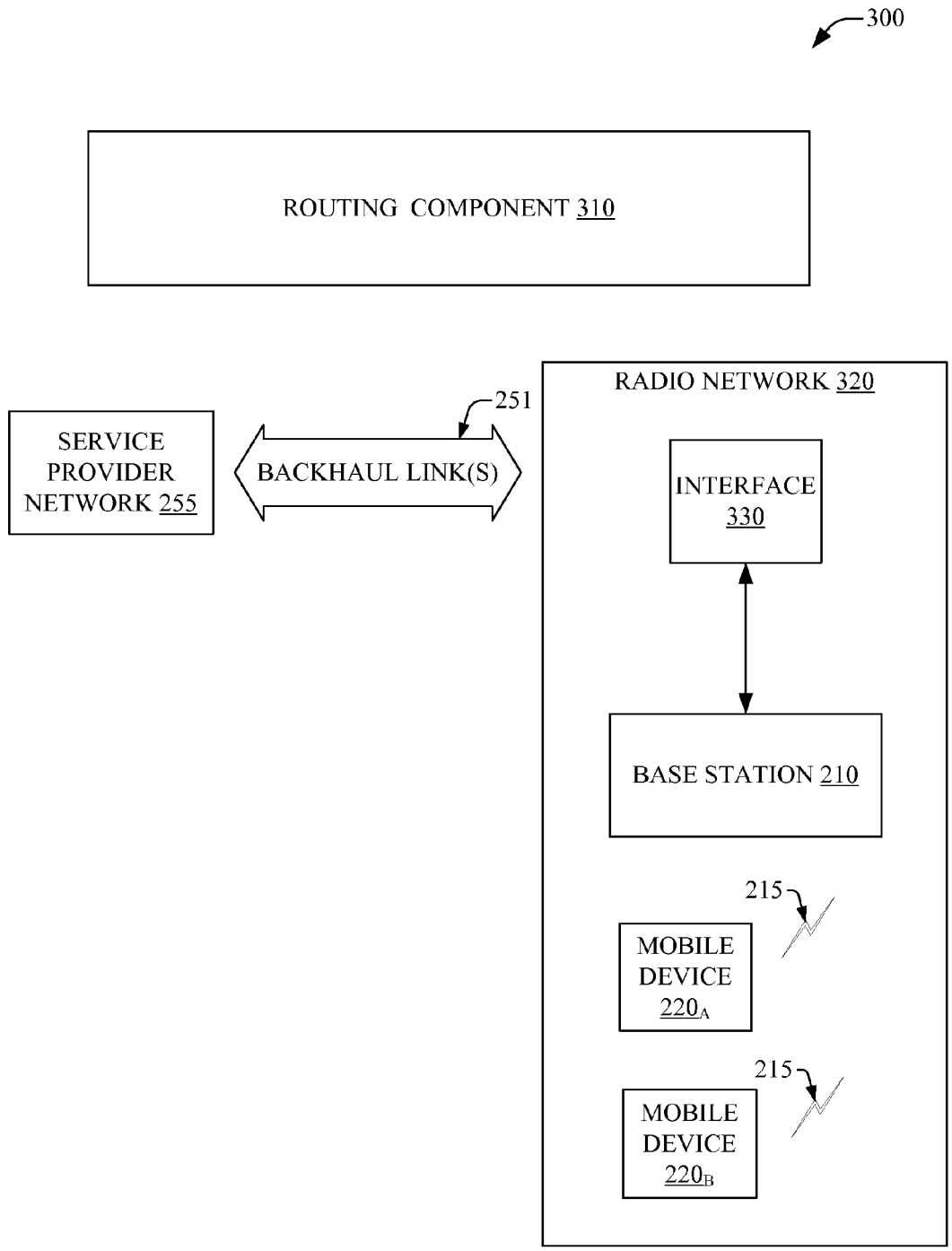
FIG. 3 illustrates another wireless environment for effectively routing SMS and MMS messages to short codes, in accordance with an embodiment.

FIG. 3 illustrates another wireless environment (300) that effectively routes SMS and MMS messages to short codes, in accordance with an embodiment. Wireless environment 300 can comprise one or more base stations 210, for example: coupled to a base station controller (BSC) of a base station subsystem (BSS) (see, e.g., FIG. 4); coupled to a radio network controller (RNC) of a UMTS Terrestrial Radio Access Network (UTRAN) (see, e.g., FIG. 5). Radio network 320 can couple to a core network, e.g., service provider network 255, via one or more backhaul links 251 (see above) to facilitate wireless communication and data transfer to one or more wireless devices, e.g., mobile wireless device 220$_A$/mobile wireless device 220$_B$, in accordance with the disclosed subject matter. Moreover, radio network 320 can comprise any wireless technology, e.g., GSM, UMTS, etc.

Wireless environment 300 includes routing component 310 that can facilitate effective routing of SMS and MMS messages to short codes within any wireless technology supporting SMS and MMS messaging, e.g., GSM, 3GPP UMTS. As described above, conventional group messaging techniques can fail to deliver text-only messages received via an MMS protocol when the text-only messages are addressed to short codes. Compared to such techniques, various systems, methods, and apparatus described herein effectively route SMS and MMS messages to short codes by routing group directed, text-only messages as non-group messages via an SMS protocol.

For example, routing component 310 can receive an MMS-based group message sent via mobile wireless device 220$_A$ or mobile wireless device 220$_B$. The MMS-based group message can be directed to at least two addressees to facilitate group messaging. Routing component 310 can identify whether the MMS-based group message is associated with, e.g., addressed to, one or more short codes. As described above, SMS and MMS messages can be sent to short codes to facilitate convenient addressing and/or dialing.

If routing component 310 identifies that the MMS-based group message is addressed to one or more short codes, routing component 310 can determine whether the MMS-based group message only includes text. If the MMS-based group message only includes text, then routing component 310 can convert the MMS-based, text-only group message to a non-group SMS-based message. Further, routing component 310 can transmit the non-group SMS-based message to the one or more short codes via an SMS protocol—successfully transmitting the associated text-only MMS-based group message to non-MMS-based endpoints and/or SMS-based service providers.

It should be appreciated that although routing component 310 is illustrated in FIG. 3 as an entity distinct from radio network 320 and service provider network 255, routing component 310 can be located/included within and/or across one or more components, e.g., hardware, software, etc., of wireless environment 300, e.g., within or among hardware and/or software of components of radio network 320 and/or service provider network 255.

Further, one or more aspects of wireless environment 300, and the wireless environments, networks, systems, apparatus, and processes explained herein, can constitute machine-executable instructions embodied within a machine, e.g., embodied in a computer readable medium associated with the machine. Such instructions, when executed by the machine, can cause the machine to perform the operations described. Additionally, the systems and processes can be embodied within hardware, such as an application specific integrated circuit (ASIC) or the like. Moreover, the order in which some or all of the process blocks appear in each process should not be deemed limiting. Rather, it should be understood by a person of ordinary skill in the art having the benefit of the instant disclosure that some of the process blocks can be executed in a variety of orders not illustrated.

Figure 4:
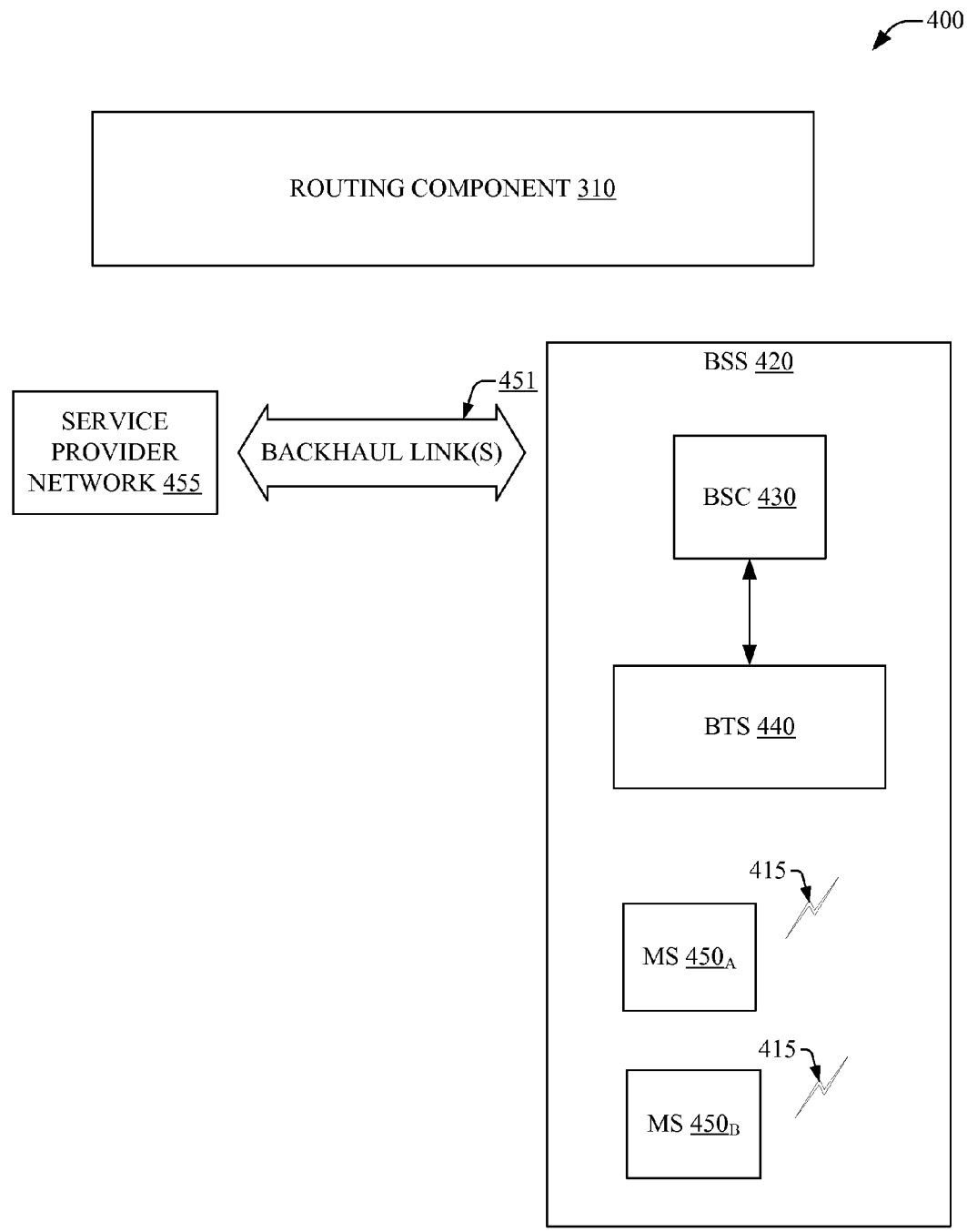
FIG. 4 illustrates a GSM wireless environment for effectively routing SMS and MMS messages to short codes, in accordance with an embodiment.

FIG. 4 illustrates a GSM wireless environment 400 that effectively routes SMS and MMS messages to short codes, in accordance with an embodiment. GSM wireless environment 400 can include at least one base transceiver station (BTS) 440 coupled to base station controller (BSC) 430 to form a base station subsystem (BSS) 420 of a GSM network. BSS 420 can be coupled to a core network, e.g., service provider network 455, via one or more backhaul links 451 (see above) to facilitate wireless communication and data transfer to one or more wireless devices, e.g., mobile station 450$_A$/mobile station 450$_B$, in accordance with the disclosed subject matter. GSM wireless environment 400 includes routing component 310 (see above), which can effectively route SMS and MMS messages to short codes within the GSM network. It should be appreciated that although routing component 310 is illustrated in FIG. 4 as an entity distinct from other entities and/or components of GSM wireless environment 400, one or more aspects of routing component 310 can be located/included within one or more components, e.g., hardware, software, etc. (e.g., BSS 420), of GSM wireless environment 400.

Figure 5:
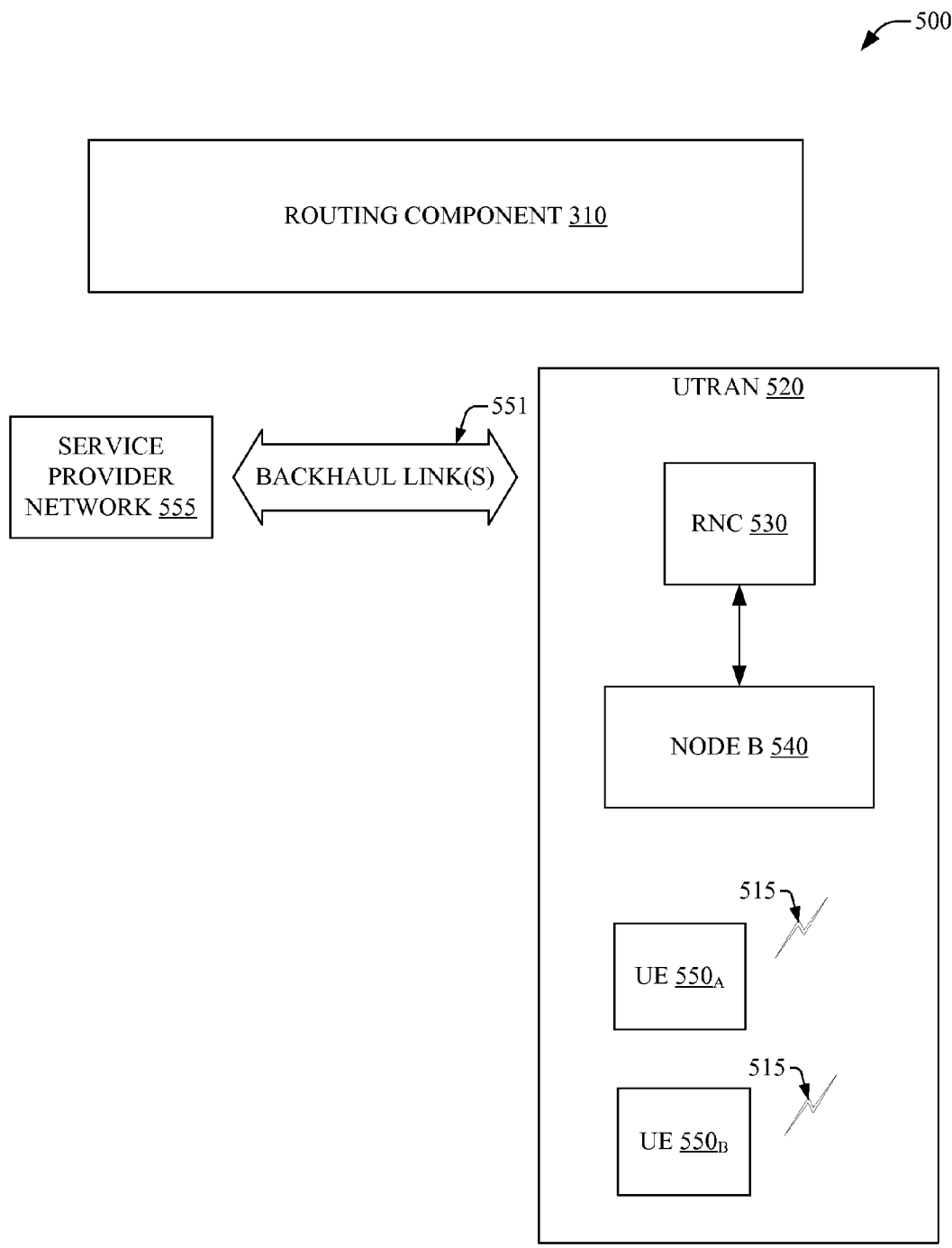
FIG. 5 illustrates a UMTS wireless environment for effectively routing SMS and MMS messages to short codes, in accordance with an embodiment.

FIG. 5 illustrates a UMTS wireless environment 500 that effectively routes SMS and MMS messages to short codes, in accordance with an embodiment. UMTS wireless environment 500 can include at least one node B 540 coupled to a radio network controller 530 to form a UMTS Terrestrial Radio Access Network (UTRAN) 520 of a UMTS network. UTRAN 520 can couple to a core network, e.g., service provider network 555, via one or more backhaul links 551 (see above) to facilitate wireless communication and data transfer to one or more wireless devices, e.g., user equipment 550$_A$/user equipment 550$_B$, in accordance with the disclosed subject matter. UMTS wireless environment 500 includes routing component 310 (see above) that can effectively route SMS and MMS messages to short codes within the UMTS network, e.g., a 3GPP network. It should be appreciated that although routing component 310 is illustrated in FIG. 5 as an entity distinct from other entities and/or components of UMTS wireless environment 500, one or more aspects of routing component 310 can be located/included within one or more components, e.g., hardware, software, etc. (e.g., UTRAN 520), of UMTS wireless environment 500, e.g., a 3GPP network.

Figure 6:
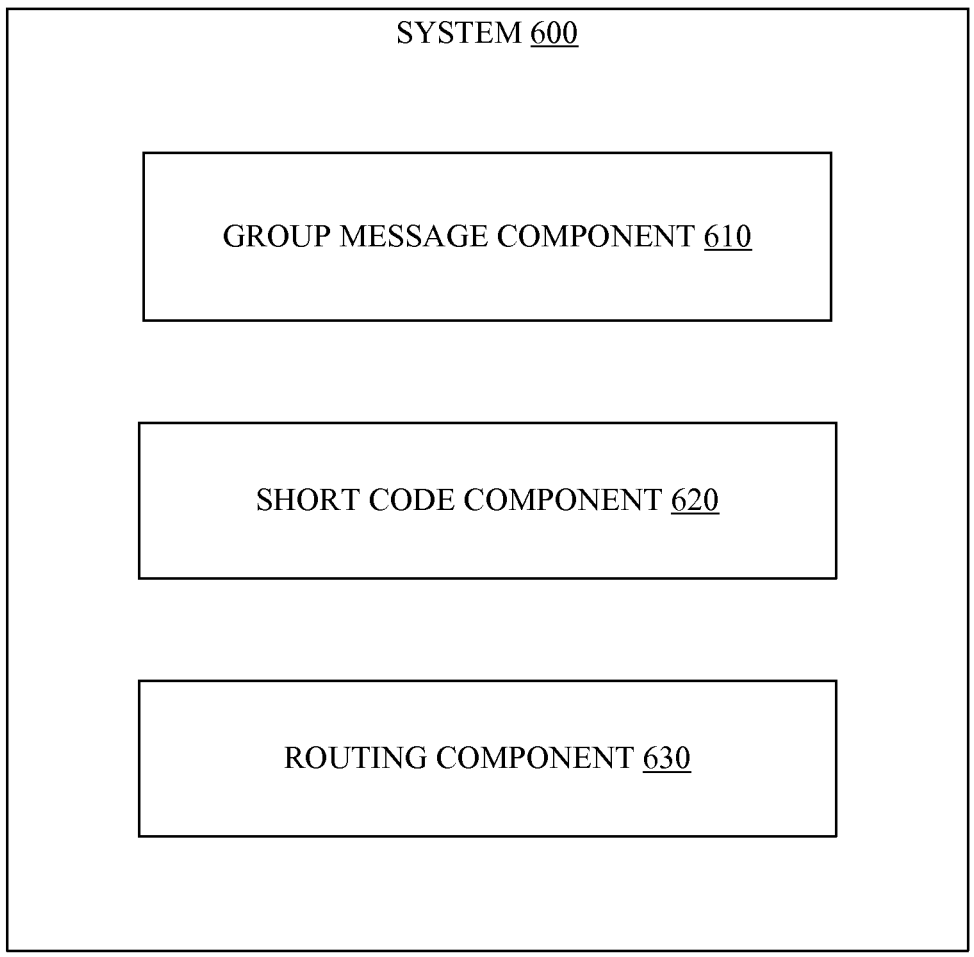
FIG. 6 illustrates a system for effectively routing SMS and MMS messages to short codes, in accordance with an embodiment.

FIG. 6 illustrates a system 600 that effectively routes SMS and MMS messages to short codes, in accordance with an embodiment. System 600 can include a group messaging component 610, a short code component 620, and a routing component 630. Group messaging component 610 can be configured to receive a message transmitted via a wireless communications device. In an aspect, group messaging component 610 can receive SMS and MMS messages via mobile wireless device 220$_A$ and/or mobile wireless device 220$_B$. As described above, SMS messages are text-only messages, while MMS messages can facilitate (1) sending messages to multiple recipients and/or (2) sending messages that include multimedia content, e.g., music, photographs, etc.

Figure 7:
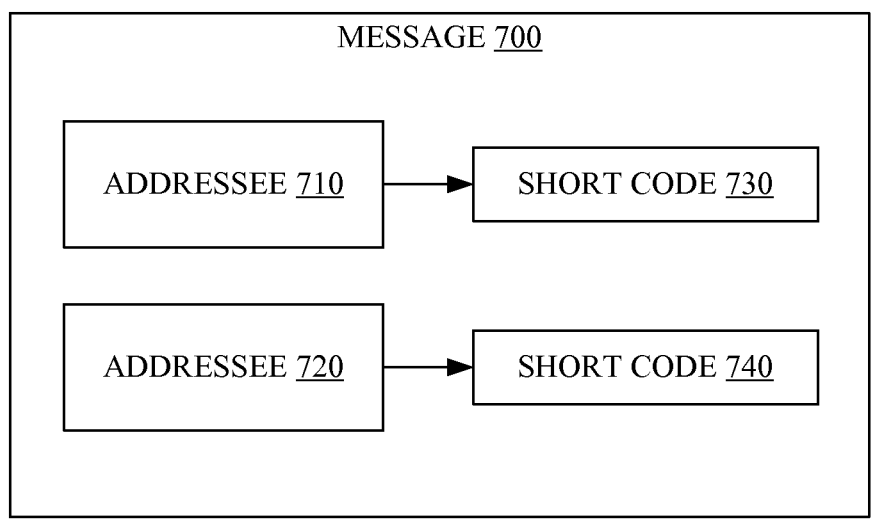
FIG. 7 illustrates a message transmitted by a wireless communications device, in accordance with an embodiment.

Further, group messaging component 610 can be configured to determine whether the message comprises at least two addressees. In an aspect, the at least two addressees can be associated with telephone numbers conforming to NANPA guidelines, e.g., non-short code telephone numbers. In another aspect illustrated by FIG. 7, one or more of the at least two addressees can be associated with a short code. For example, a message 700 transmitted by a wireless communications device (not shown) and received by group messaging component 610 is illustrated by FIG. 7, in accordance with an embodiment. Message 700 can include two addressees (710 and 720) associated with different short codes (730 and 740). It should be appreciated that although message 700 includes two addressees, other messages received by group messaging component 610 can (1) include more than two addressees; (2) associate more than one addressee with a short code; and/or (3) include at least one addressee that is associated with a non-short code telephone number, e.g., the at least one addressee is associated with a domestic or international telephone number conforming to NANPA guidelines.

Figure 8:
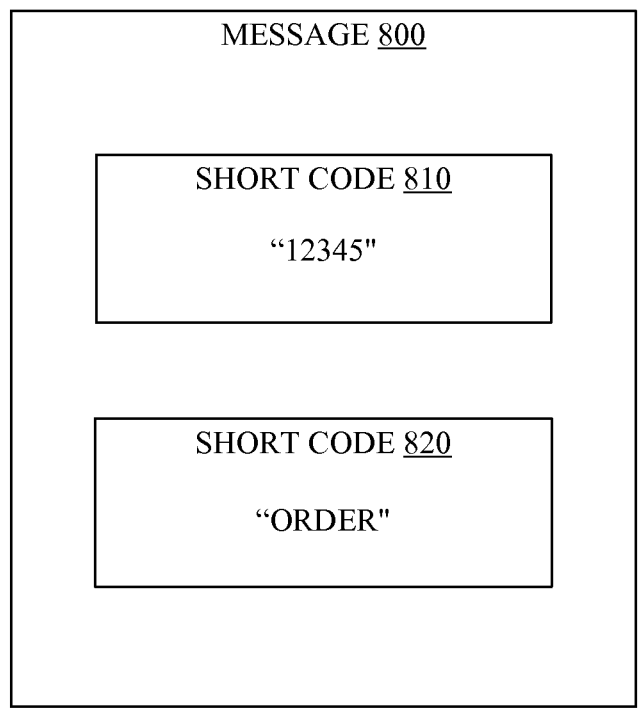
FIG. 8 illustrates another message transmitted by a wireless communications device, in accordance with an embodiment.

As described above, a short code is a telephone number used to address SMS and/or MMS messages. Such messages can be sent to short codes via mobile wireless devices, e.g., for television voting, ordering ringtones, mobile services, etc. Referring now to FIG. 8, a message 800 including short codes 810 and 820 is illustrated, according to an embodiment. Short code 810 includes five-digits "12345", and can be dialed, e.g., via mobile wireless device $220_A$ and/or mobile wireless device $220_B$, to place a call that transmits an SMS message related to a service, e.g., television voting. Correspondingly, group messaging component 610 can receive the SMS message for routing, e.g., to SMS-based endpoints/service providers, via routing component 630. Short code 820 includes five-characters "ORDER", and can be dialed, e.g., via mobile wireless device $220_A$ and/or mobile wireless device $220_B$, to place a call that transmits an SMS message related to another service, e.g., for ordering ringtone(s). Group messaging component 610 can receive the SMS message for routing, e.g., for routing the SMS message to SMS-based endpoints/service providers, via routing component 630.

Although conventional MMS techniques can route SMS and MMS messages via short codes, such techniques can limit customer experience(s) by incorrectly routing text-only, short code addressed group messages via MMS protocol. Accordingly, and referring now to FIG. 6, short code component 620 of system 600 can be configured to identify whether the at least two addressees are associated with at least one short code. Further, short code component 620 can be configured to recognize whether the message is a text-only message. If the message is a text-only message, and the at least two addressees are associated with the at least one short code, routing component 630 can be configured to convert the message to an SMS message. In addition, routing component 630 can be configured to route the SMS message to the at least one short code. In this way, system 600 can successfully transmit short code addressed, text-only, group messages to SMS-based endpoints/service providers via SMS protocol.

Figure 9:
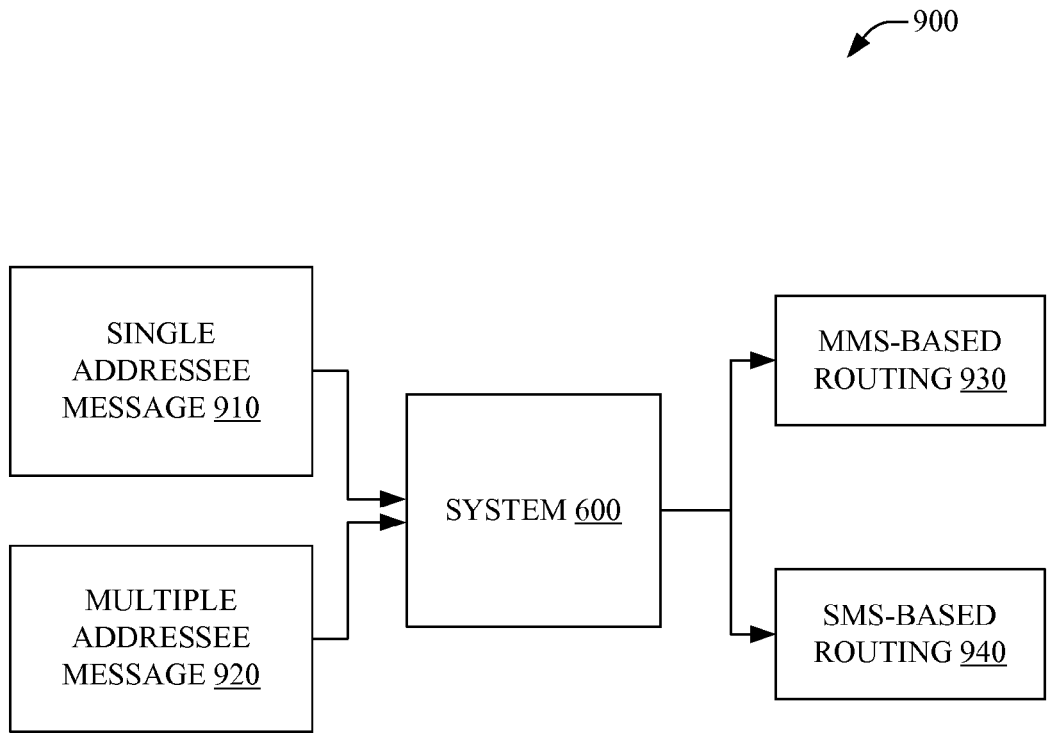
FIG. 9 illustrates another wireless environment for effectively routing SMS and MMS messages to short codes, in accordance with an embodiment.

For example, in an example wireless environment 900 illustrated by FIG. 9, system 600 can receive, via group messaging component 610, multiple addressee message 920, which can be associated with a short code, e.g., short code 810 or short code 820. If multiple addressee message 920 is an MMS-based message that does not include multimedia content, then system 600 can route multiple addressee message 920 to the short code via SMS-based routing 940, e.g., utilizing component 630. On the other hand, if multiple addressee message 920 is an MMS-based message including multimedia content, then system 600 can route multiple addressee message 920 to the short code via MMS-based routing 930, e.g., utilizing routing component 630. In another aspect, system 600 can receive, via group messaging component 610, multiple addressee message 920 that can be associated with a non-short code telephone number. Accordingly, system 600 can route multiple addressee message 920 to the non-short code telephone number via MMS-based routing 930, e.g., utilizing routing component 630—regardless of whether multiple addressee message 920 comprises multimedia content.

In another aspect illustrated by FIG. 9, system 600 can receive, via group messaging component 610, single addressee message 910. Single addressee message 910 can be an SMS message that only includes text, or an MMS message including multimedia content, e.g., music, photographs, etc. Further, single addressee message 910 can include a short code, and/or be associated with a non-short code telephone number. As such, system 600 can route single addressee message 910 to the non-short code telephone number and/or the short code via SMS-based routing 940 when single addressee message 910 comprises only text. Conversely, system 600 can route single addressee message 910 to the non-short code telephone number and/or the sort code via MMS-based routing 930 when single addressee message 910 comprises multimedia content.

Figure 10:
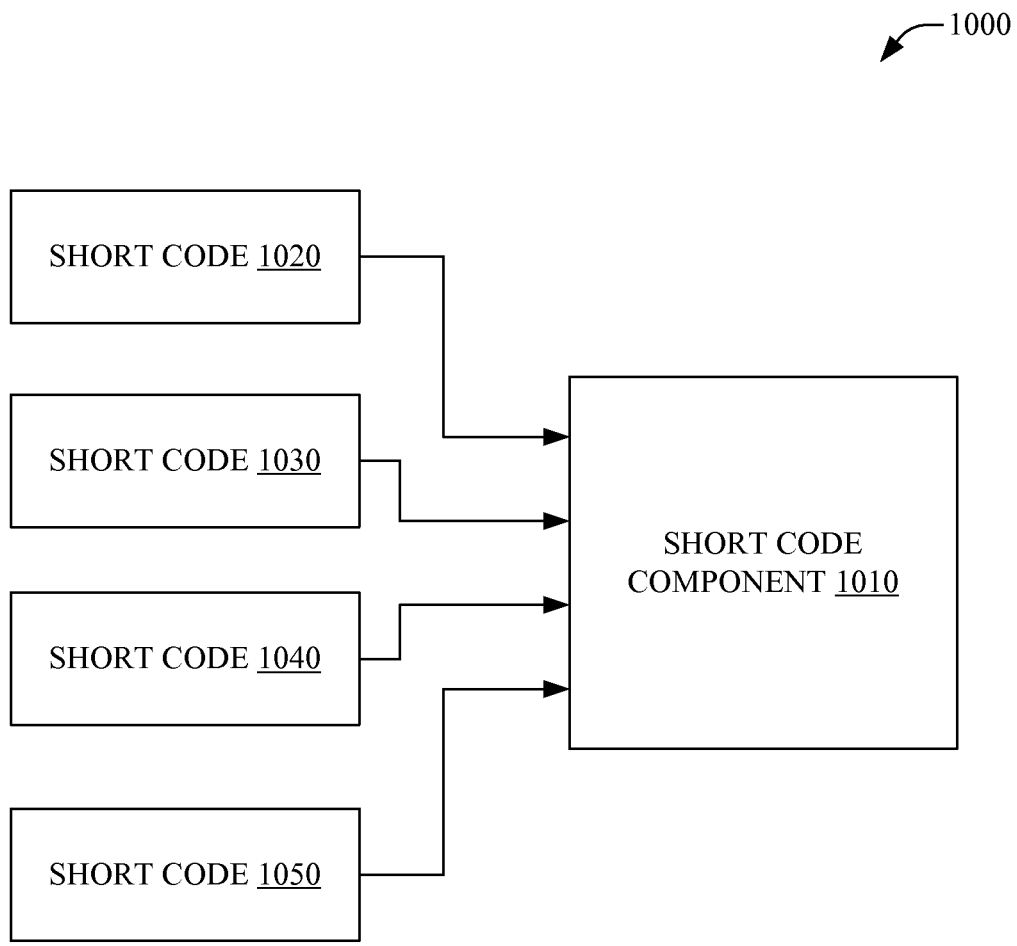
FIG. 10 illustrates a system including a short code component for effectively routing SMS and MMS messages to short codes, in accordance with an embodiment.

FIG. 10 illustrates a system 1000 including a short code component 1010 that facilitates effective routing of SMS and MMS messages to short codes, in accordance with an embodiment. Short code component 1010 can detect whether a message received from a wireless communications device within system 1000, e.g., via group message component 610, includes a short code. FIG. 10 illustrates four short codes (1020, 1030, 1040, and 1050) that can be detected by short code component 1010. For example, short code component 1010 can detect short code 1020 by determining that short code 1020 is a non-international number less than 10 digits long. Short code component 1010 can detect short code 1030 by determining that short code 1030 is a non-international ten digit number that does not conform to NANPA guidelines related to a Mobile Station Integrated Services Digital Network (MSISDN) number, which can be used as a data channel terminal number.

Further, short code component 1010 can detect short code 1040 by determining that short code 1040 is a non-international eleven digit number that begins with a "1", while determining remaining 10 digits of the non-international eleven digit number do not conform to the NANPA guidelines related to an MSISDN number. In addition, short code component 1010 can detect short code 1050 by determining that short code 1050 is an international eleven digit number that begins with a country code "1", while determining remaining 10 of the international eleven digit number do not conform to the NANPA guidelines related to an MSISDN number.

Figure 11:
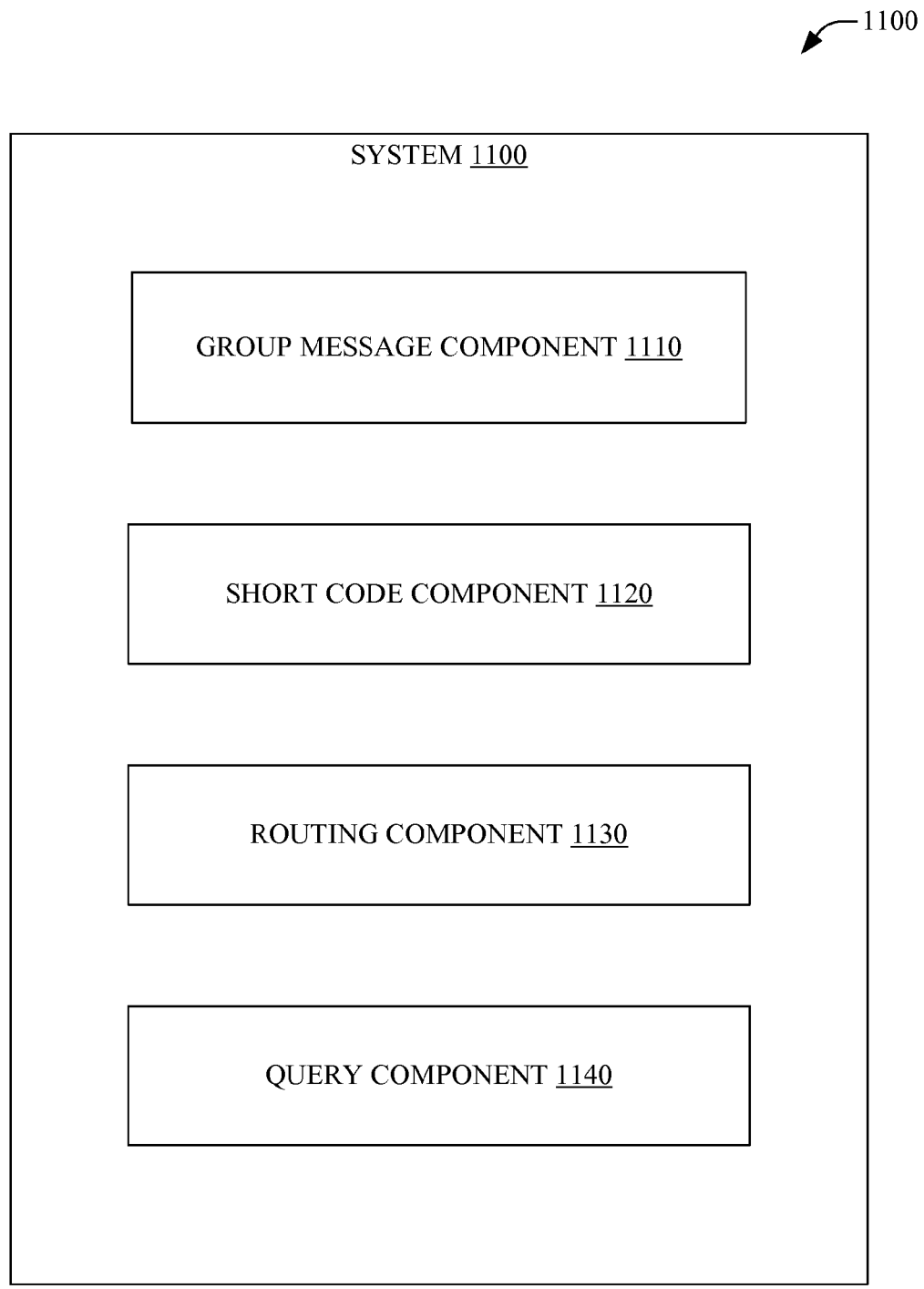
FIG. 11 illustrates a system including a query component for effectively routing SMS and MMS messages to short codes, in accordance with an embodiment.

FIG. 11 illustrates a system 1100 including a query component 1140 that facilitates effective routing of SMS and MMS messages to short codes, in accordance with an embodiment. Query component 1140 can be configured to determine, e.g., utilizing short code component 1120, whether the at least two addressees, related to the discussion of system 600 above, are associated with at least one non-short code telephone number and the at least one short code. When the at least two addressees are associated with the at least one non-short code telephone number and the at least one short code, and when the message does not include multimedia content, e.g., determined by group message component 1110, query component 1140 can indicate via the wireless communications device, e.g., via another message transmitted to the wireless communications device, that the message will be routed to the at least two addressees via an SMS protocol. Query component 1140 can receive a confirmation via the wireless communications device, e.g., sent by a user of the wireless communications device, to route the message to the at least two addressees via the SMS protocol. Accordingly, routing component 1130 can convert the message to an SMS message and route the SMS message to the at least one non-short code telephone number and the at least one short code based on, at least in part, the confirmation.

Figure 12:
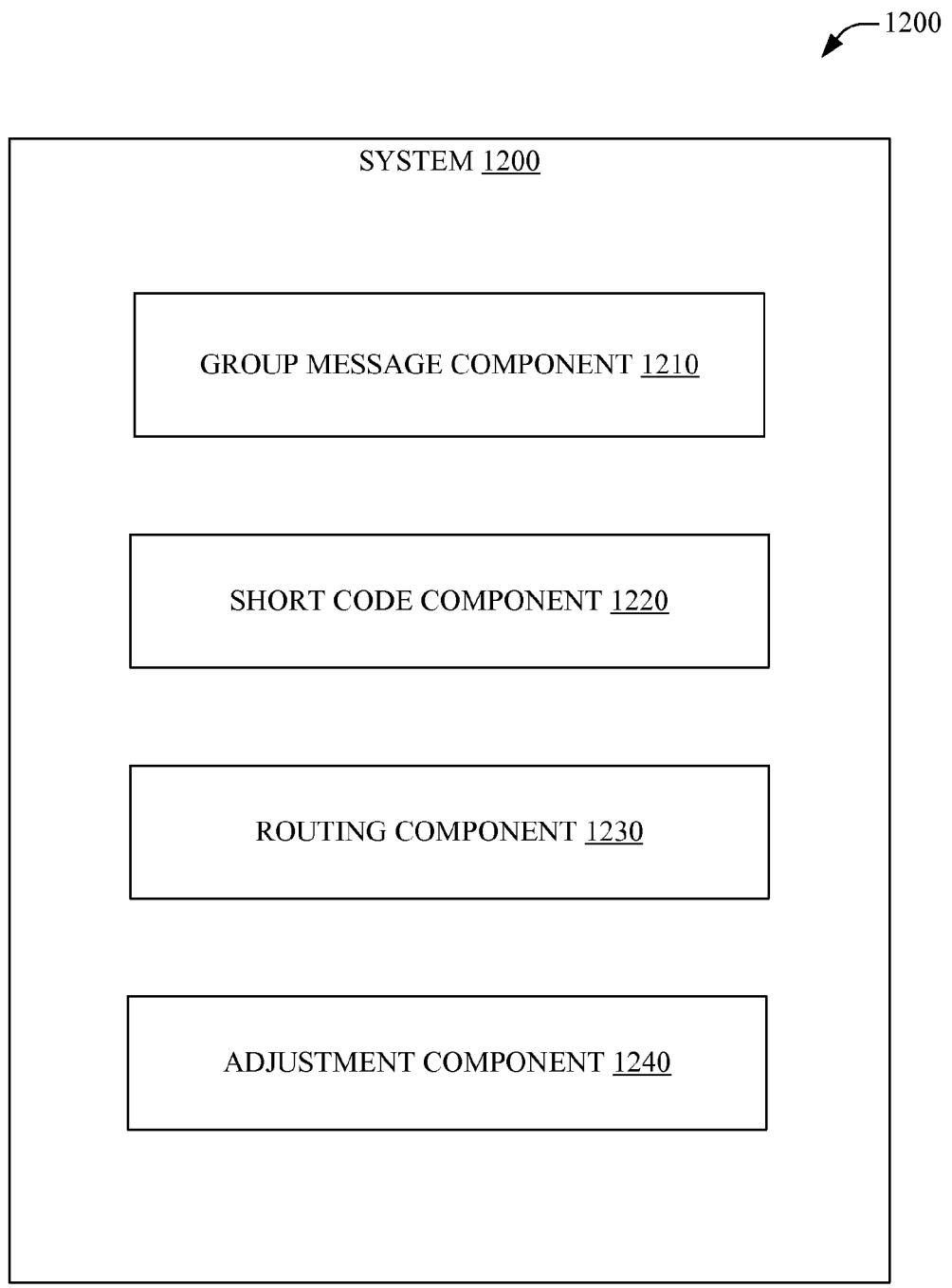
FIG. 12 illustrates a system 1200 including an adjustment component for effectively routing SMS and MMS messages to short codes, in accordance with an embodiment.

FIG. 12 illustrates a system 1200 including an adjustment component 1240 that facilitates effective routing of SMS and MMS messages to short codes, in accordance with an embodiment. Adjustment component 1240 can be configured to determine whether the at least two addressees, related to the discussion of system 600 above, are associated with at least one non-short code telephone number and the at least one short code. When the at least two addressees are associated with the at least one non-short code telephone number and the at least one short code, and when the message does not include multimedia content, adjustment component 1240 can request a confirmation via the wireless communications device, e.g., by sending the request via another message transmitted to the wireless communications device, to route the message to one or more of the at least two addressees that are not associated with the at least one short code. If routing component 1230 receives the confirmation via the wireless communications device, e.g., sent by a user of the wireless communications device, to route the message to the one or more of the at least two addressees not associated with the at least one short code, then routing component 1230 can route the message to the one or more of the at least two addressees via an MMS protocol based on, at least in part, receiving the confirmation via the wireless communications device.

FIGS. 13-20 illustrate methodologies in accordance with the disclosed subject matter. For simplicity of explanation, the methodologies are depicted and described as a series of acts. It is to be understood and appreciated that the subject innovation is not limited by the acts illustrated and/or by the order of acts. For example, acts can occur in various orders and/or concurrently, and with other acts not presented or described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Figure 13:
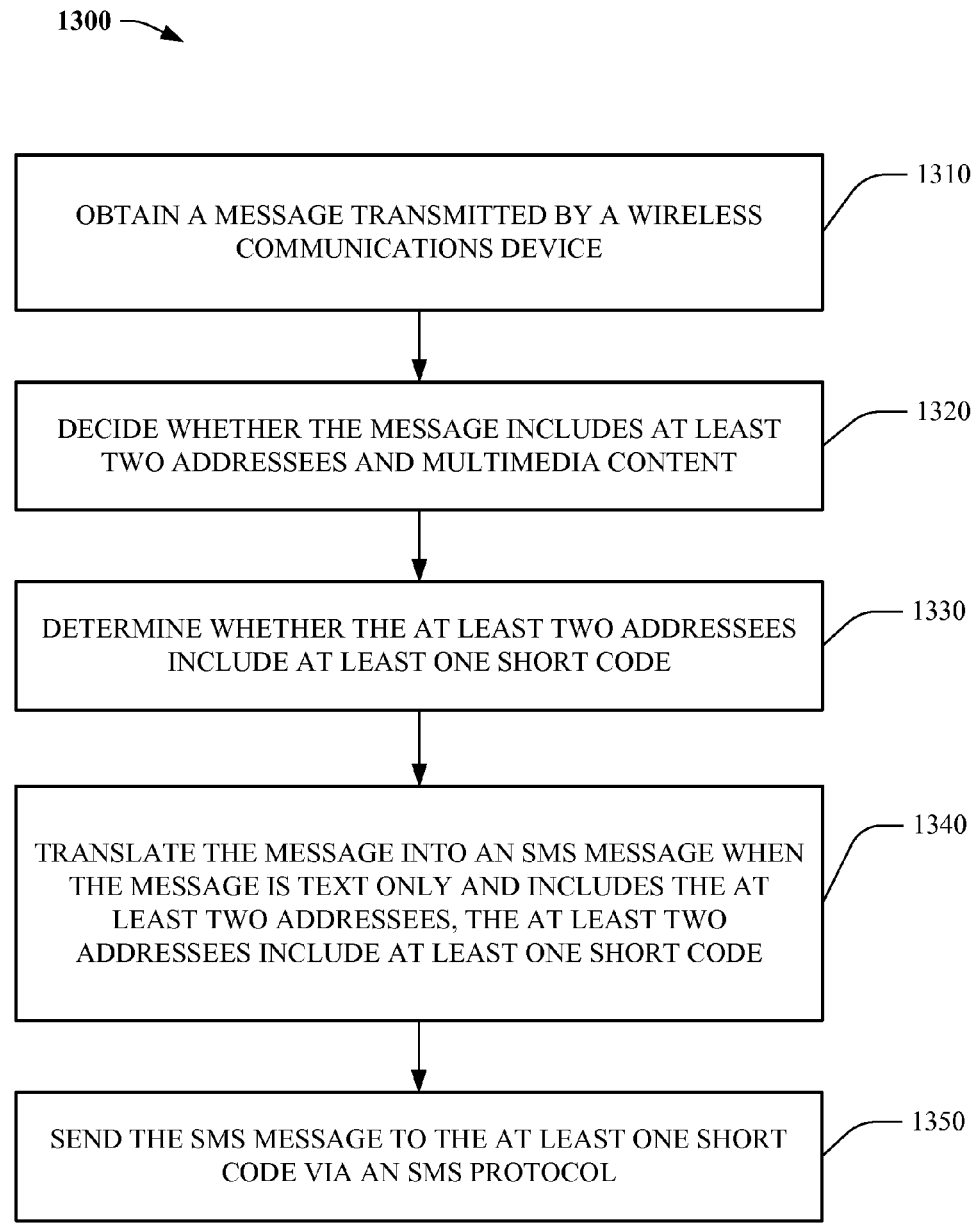
FIG. 13 illustrates a process for effectively routing SMS and MMS messages to short codes, in accordance with an embodiment.

Referring now to FIG. 13, a process 1300 for effectively routing SMS and MMS messages to short codes is illustrated, in accordance with an embodiment. At 1310, a message transmitted by a wireless communications device, e.g., mobile wireless device 220$_A$ or mobile wireless device 220$_B$, can be received, e.g., via radio network 320. It can be decided at 1320 whether the message includes at least two addressees and multimedia content, e.g., via system 600. Further, at 1330, it can be determined whether the at least two addressees include at least one short code. If it is decided that the message includes the at least two addressees, but does not include multimedia content; and if it is determined that the at least two addressees include the at least one short code at 1320 and 1330, respectively, the message can be translated into an SMS message at 1340. At 1350, the SMS message can be sent to the at least one short code via an SMS protocol. In this way, process 1300 can successfully transmit a text-only MMS-based group message to non-MMS-based endpoints and/or SMS-based service providers.

Figure 14:
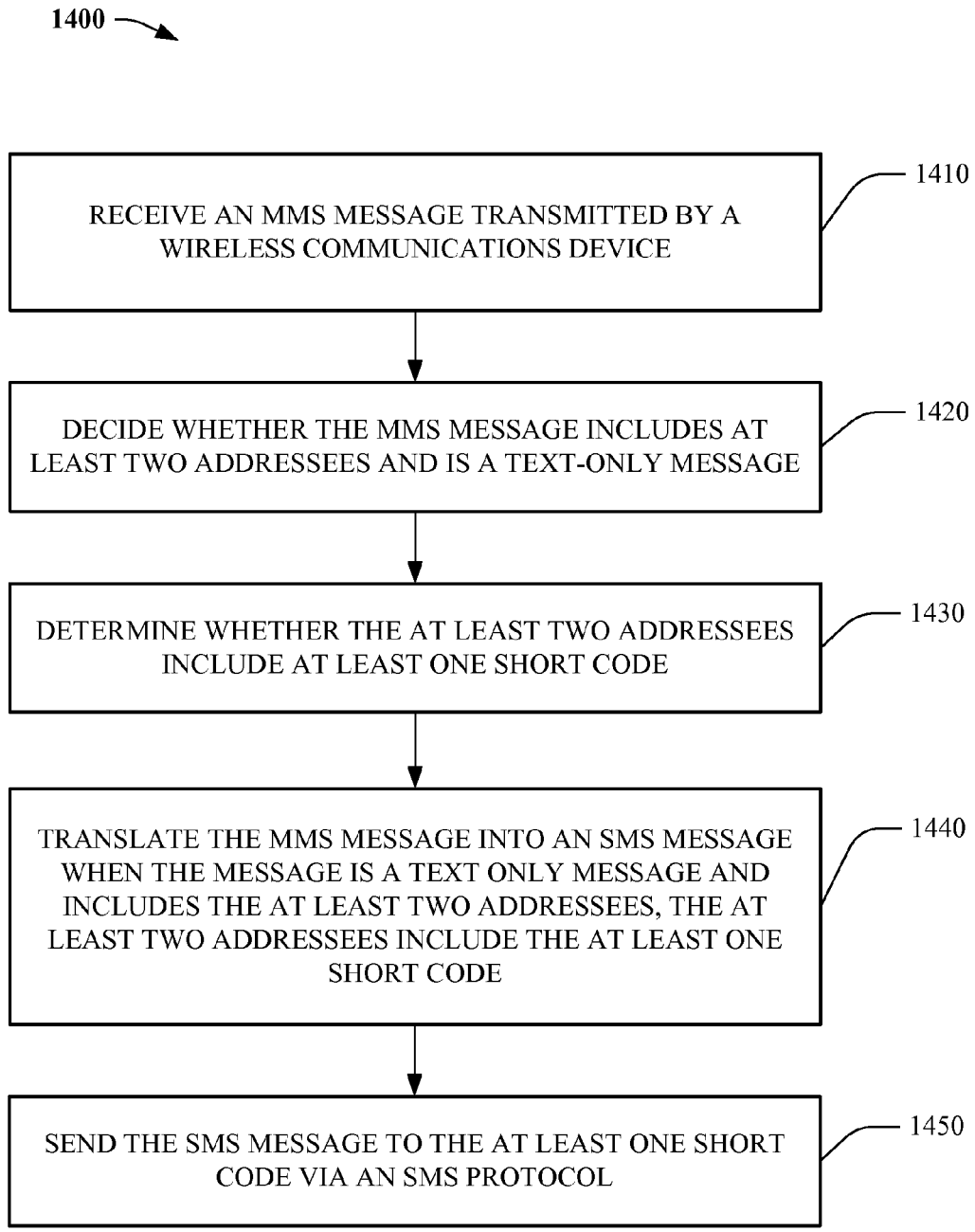
FIG. 14 illustrates another process for effectively routing SMS and MMS messages to short codes, in accordance with an embodiment.

FIG. 14 illustrates another process (1400) for effectively routing SMS and MMS messages to short codes, in accordance with an embodiment. At 1410, an MMS message transmitted by a wireless communications device, e.g., mobile wireless device 220$_A$ or mobile wireless device 220$_B$, can be received, e.g., via system 600. It can be decided, at 1420, whether the MMS message includes at least two addressees and is a text-only message. At 1430, it can be determined whether the at least two addressees include short code(s). The MMS message can be translated into an SMS message at 1440 when the message includes the at least two addressees, is a text-only message, and the at least two addressees include short code(s). At 1450, the SMS message can be sent to the short code(s) via an SMS protocol.

Figure 15:
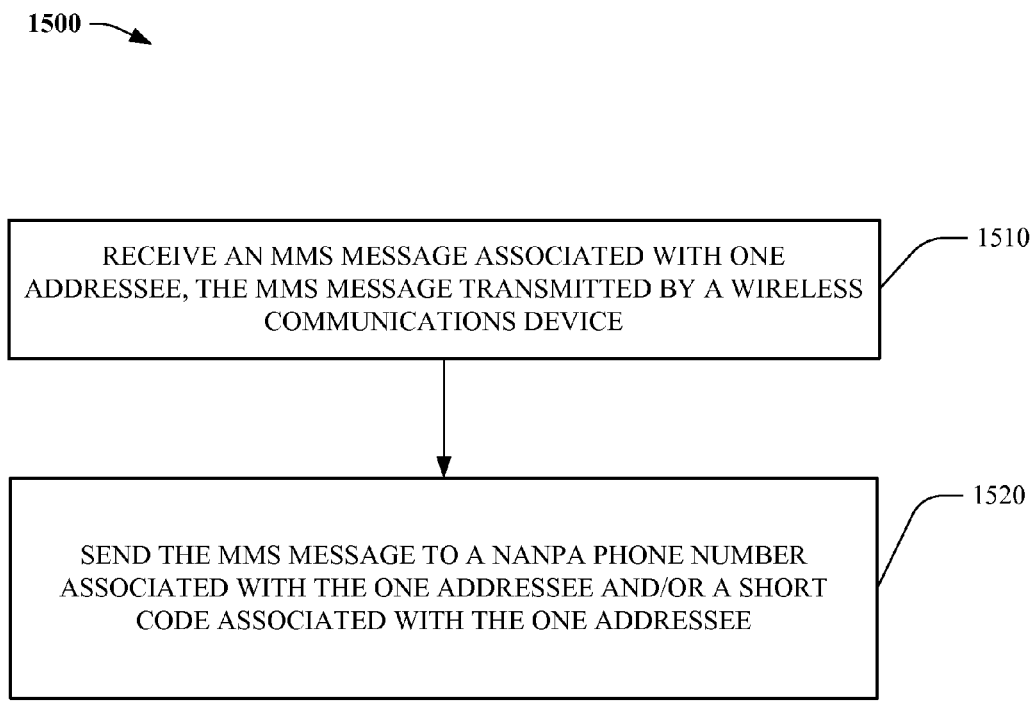
FIG. 15 illustrates a process for sending an MMS message associated with one addressee to a North American Numbering Plan Administration (NANPA) phone number of the one addressee or a short code of the one addressee, in accordance with an embodiment.

FIG. 15 illustrates a process 1500 that sends an MMS message associated with one addressee to a North American Numbering Plan Administration (NANPA) phone number of the one addressee, e.g., a non-short code phone number, or a short code of the one addressee, in accordance with an embodiment. At 1510, an MMS message associated with one addressee and transmitted by a wireless communications device can be received, e.g., via system 600. The MMS message can be sent at 1520 to the NANPA phone number of the one addressee, or the short code of the one addressee. As such, process 1500 does not translate an MMS message into an SMS message when the MMS message only includes one addressee, e.g., the MMS message is not a group message.

Figure 16:
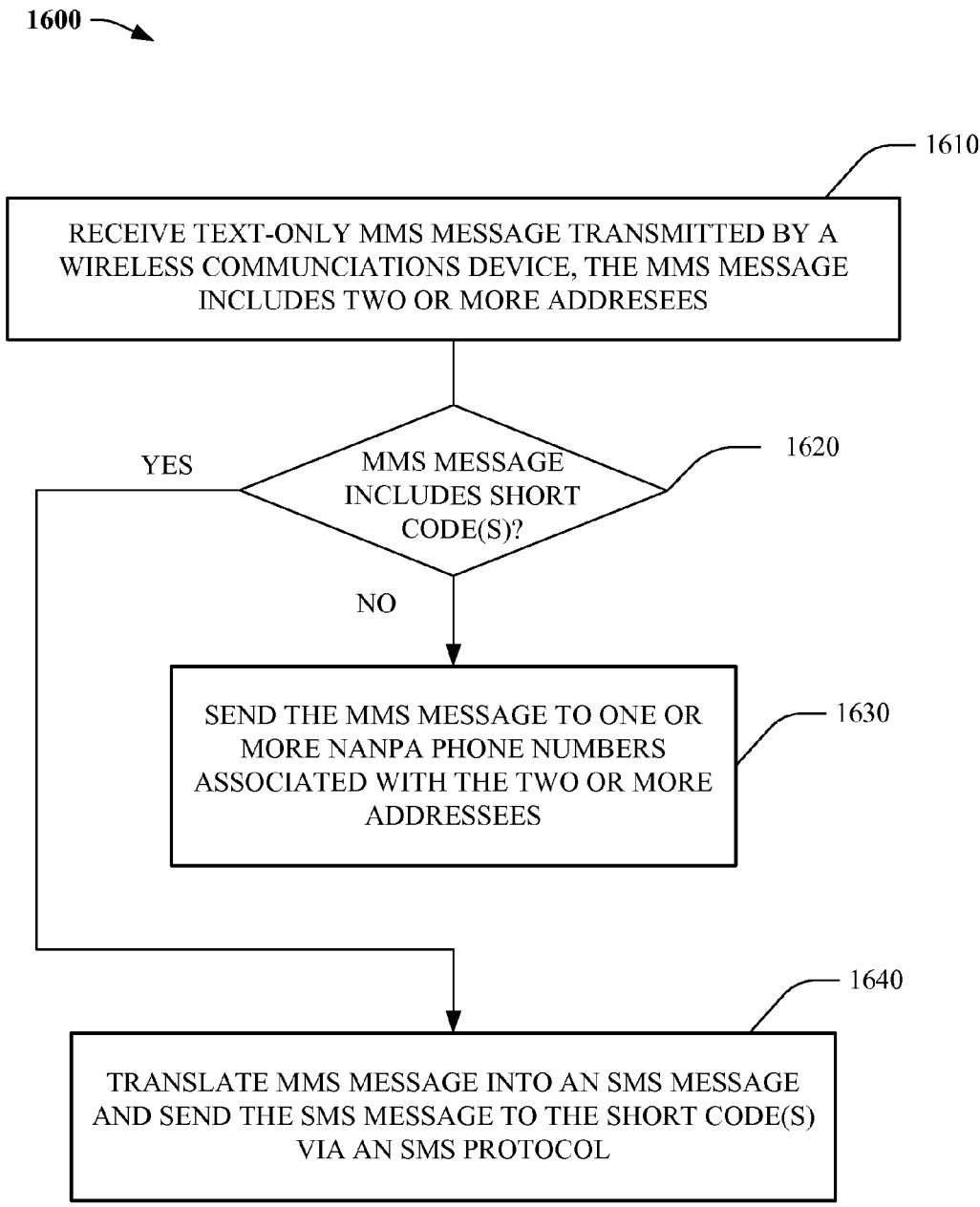
FIG. 16 illustrates a process for sending a text-only MMS message to two or more addressees, in accordance with an embodiment.

Referring now to FIG. 16, a process 1600 that can send a text-only, MMS message to two or more addressees is illustrated, in accordance with an embodiment. At 1610, a text-only, e.g., does not include multimedia content, multi-addressee MMS message transmitted by a wireless communications device can be received, e.g., via system 600. It can be determined whether the MMS message includes one or more short codes at 1620. If it is determined that the MMS message contains one or more short codes, the MMS message can be translated into an SMS message at 1640, and the SMS message sent to the one or more short codes. Otherwise, if it is determined at 1620 that the MMS message does not include one or more short codes, then the MMS message can be sent at 1630 to at least one NANPA phone number of the two or more addressees.

Figure 17:
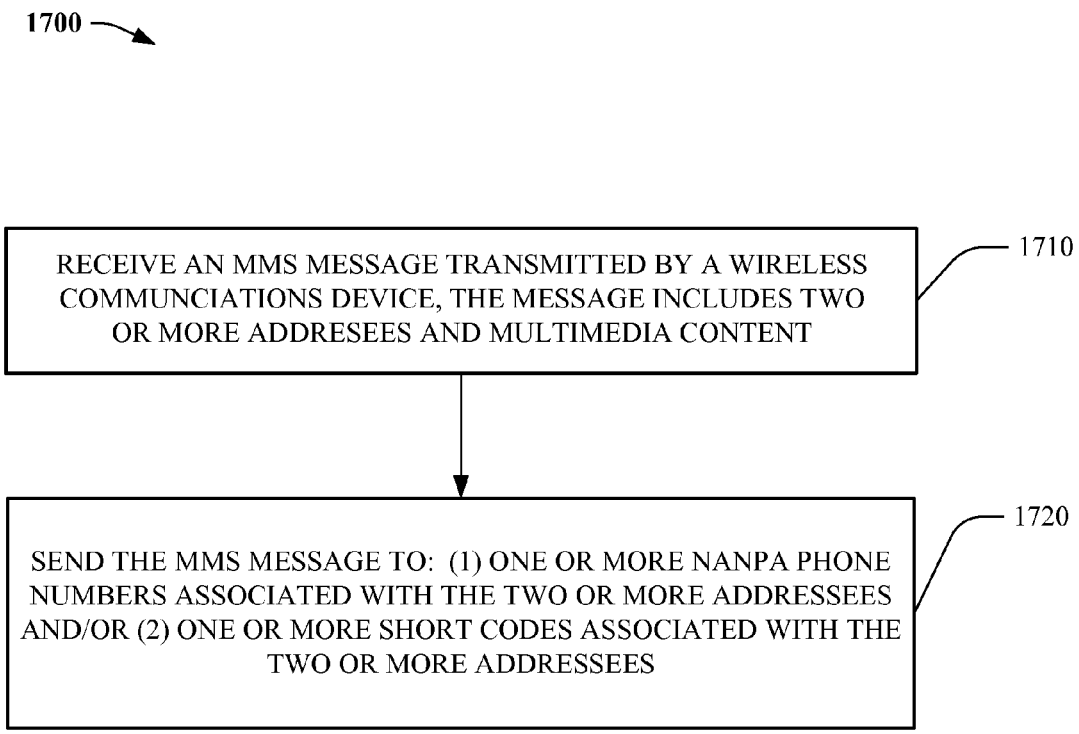
FIG. 17 illustrates a process for sending an MMS message to two or more addressees, in accordance with an embodiment.

FIG. 17 illustrates another process (1700) that can send an MMS message to two or more addressees, in accordance with an embodiment. At 1710, a multi-addressee MMS message including multimedia content and transmitted by a wireless communications device can be received. When the MMS message includes one or more NANPA phone umbers and/or one or more short codes associated with the two or more addressees, the MMS message can be transmitted to the one or more NANPA phone numbers and/or the one or more short codes at 1720.

Figure 18:
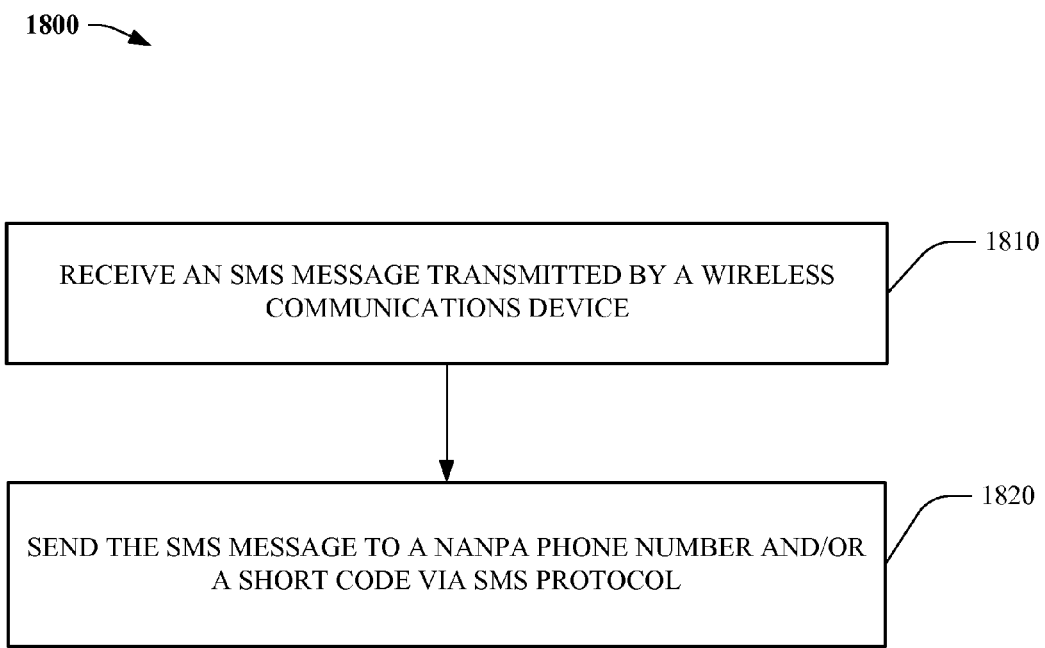
FIG. 18 illustrates a process for sending an SMS message to two or more addressees, in accordance with an embodiment.

Referring now to FIG. 18, a process 1800 for sending an SMS message to two or more addressees is illustrated, in accordance with an embodiment. At 1810, the SMS message can be received from a wireless communications device. The SMS message can be transmitted to a NANPA phone number associated with the two or more addressees, and/or a short code associated with the two or more addressees, via SMS protocol at 1820. In this way, the systems, apparatus, and process described herein can transmit SMS and MMS messages received from one or more wireless communications devices.

Figure 19:
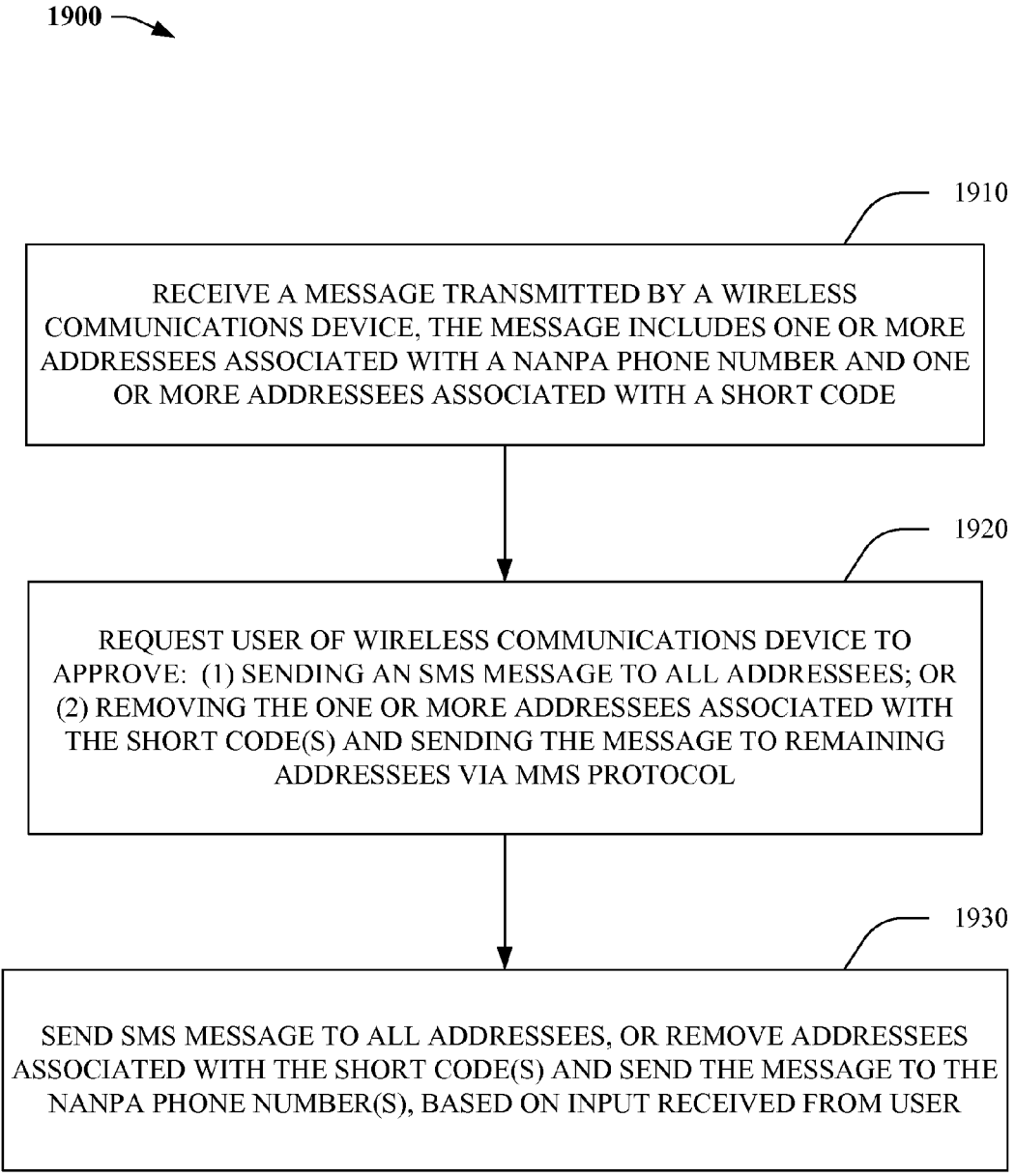
FIG. 19 illustrates a process for removing one or more addressees associated with short code(s), in accordance with an embodiment.

For example, in a process 1900 illustrated by FIG. 19, a message including two or more addressees associated with at least one NANPA phone number and at least one short code can be received from a wireless communications device at 1910, according to an embodiment. At 1920, a user of the wireless communications device can be requested to approve, or decide, whether to send an SMS message to all addressees, e.g., based on inclusion of the at least one short code; or to remove addressee(s) associated with the at least one short code, so that remaining addressees can be sent an MMS message based on the NANPA phone number(s). At 1930, the SMS message can be sent to all addressees, or the MMS message can be sent to addressees associated with the NANPA phone number(s), based on input received from the user.

Figure 20:
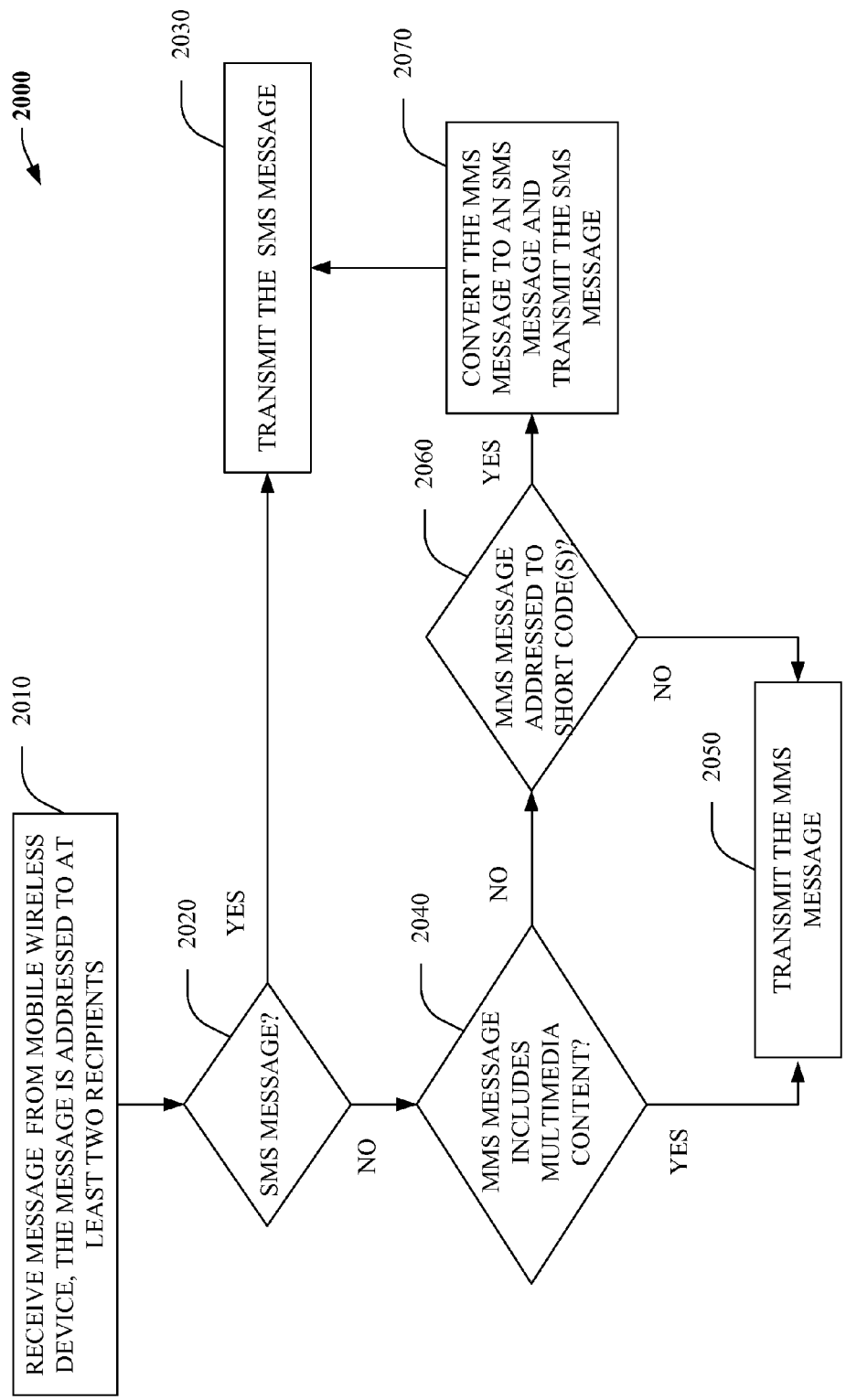
FIG. 20 illustrates another process for effectively routing SMS and MMS messages to short codes, in accordance with an embodiment.

FIG. 20 illustrates a process 2000 for effectively routing SMS and MMS messages to short codes, in accordance with an embodiment. It should be appreciated that the acts described in relation to FIG. 20, and other processes described herein, can be performed, for example, via routing components 120, 230, 310; and/or via systems 600, 1100, 1200. At 2010, a message addressed to at least two message recipients can be received from a mobile wireless device. It can be determined at 2020 whether the message is an SMS message. If the message is an SMS message, it can be transmitted, e.g., to an SMS-based endpoint and/or service provider, at 2030. Otherwise, it can be determined at 2040 whether the message is an MMS message including multimedia content. If the MMS includes multimedia content, the MMS message can be transmitted via MMS protocol at 2050. Otherwise, it can be determined at 2060 whether the MMS message, e.g., a text-only MMS message, is addressed to one or more short codes. If the text-only MMS message is addressed to one or more short codes, then the text-only MMS message can be converted to an SMS message at 2070, the SMS message transmitted via SMS protocol. If the text-only MMS message is not addressed to one or more short codes, e.g., addressed to NANPA phone number(s), then the text-only MMS message can be transmitted via MMS protocol at 2050.

Figure 21:
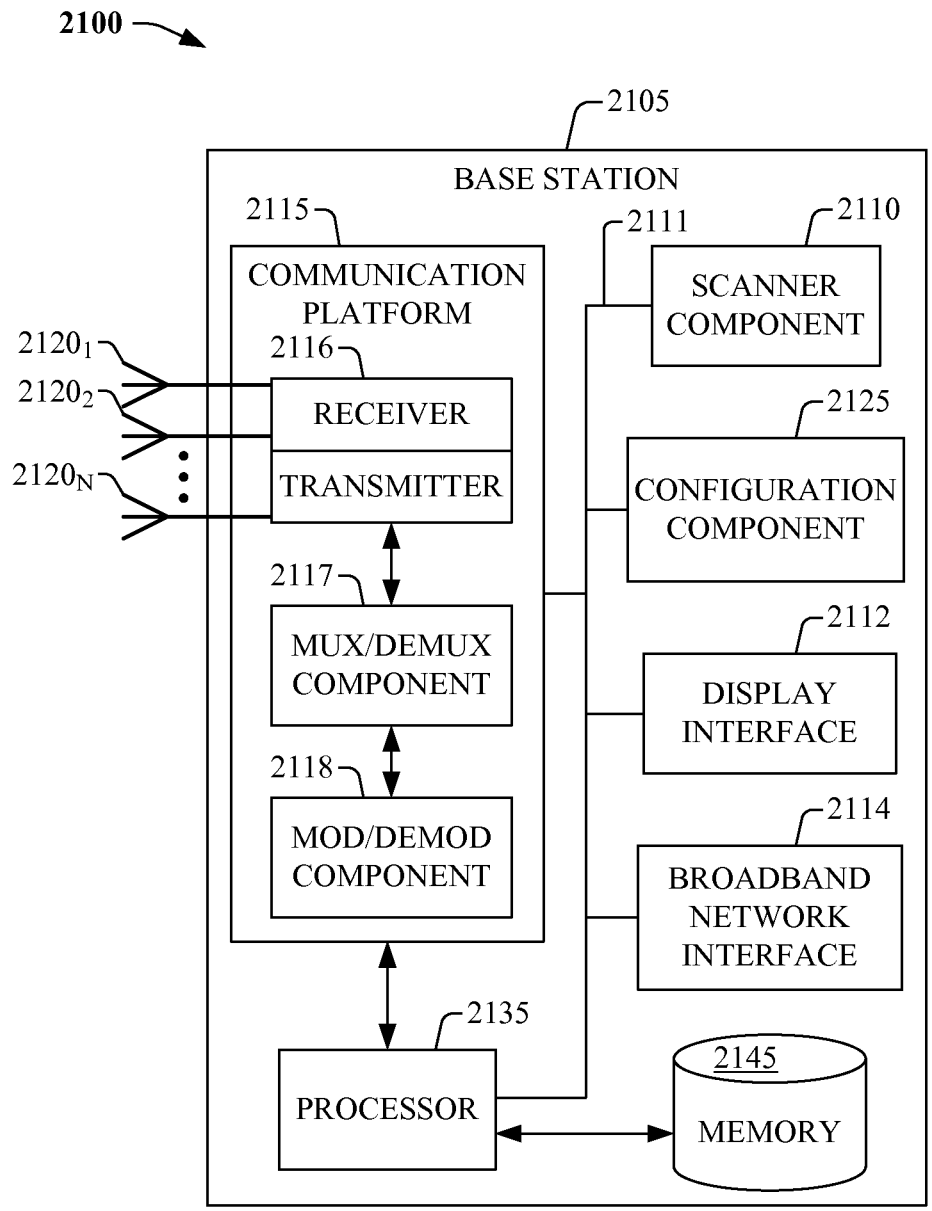
FIG. 21 illustrates a block diagram of a base station, in accordance with an embodiment.
Figure 22:
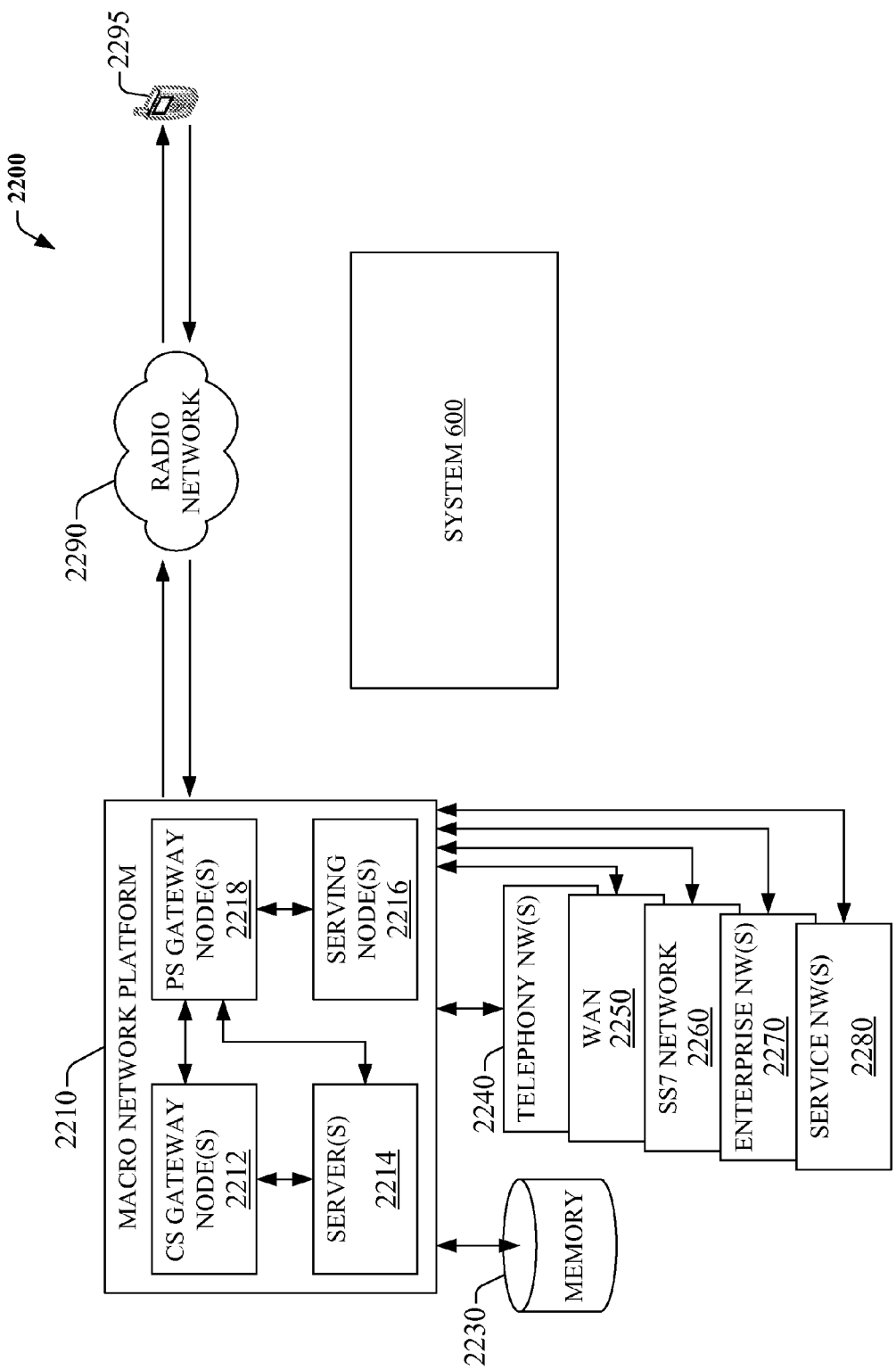
FIG. 22 illustrates a block diagram of a wireless network environment, in accordance with an embodiment.

To provide further context for various aspects of the disclosed subject matter, FIGS. 21 and 22 illustrate, respectively, a block diagram of an embodiment 2100 of a base station 2105 that can enable and/or exploit features or aspects of the disclosed subject matter; and a wireless network environment 2200 including a macro network platform 2210, radio network 2290, and system 600 exploiting aspects of the subject innovation in accordance with various aspects of the subject specification. In embodiment 2100, base station 2105 can receive and transmit signal(s) from and to wireless devices, e.g., wireless ports and routers, or the like, through a set of antennas $2120_1$-$2120_N$ (N is a positive integer). Antennas $2120_1$-$2120_N$ are a part of communication platform 2115, which comprises electronic components and associated circuitry that provide for processing and manipulation of received signal(s) and other signal(s) to be transmitted.

In an aspect, communication platform 2115 includes a receiver/transmitter 2116 that can convert analog signals to digital signals upon reception of the analog signals, and convert digital signals to analog signals upon transmission. In addition, receiver/transmitter 2116 can divide a single data stream into multiple, parallel data streams, or perform the reciprocal operation. Coupled to receiver/transmitter 2116 is a multiplexer/demultiplexer 2117 that facilitates manipulation of signals in time and frequency space. Electronic component 2117 can multiplex information (data/traffic and control/signaling) according to various multiplexing schemes such as time division multiplexing (TDM), frequency division multiplexing (FDM), orthogonal frequency division multiplexing (OFDM), code division multiplexing (CDM), space division multiplexing (SDM). In addition, mux/demux component 2117 can scramble and spread information, e.g., codes, according to substantially any code known in the art, e.g., Hadamard-Walsh codes, Baker codes, Kasami codes, polyphase codes, etc. A modulator/demodulator 2118 is also a part of communication platform 2115, and can modulate information according to multiple modulation techniques, such as frequency modulation, amplitude modulation, e.g., M-ary quadrature amplitude modulation (QAM), with M a positive integer); phase-shift keying (PSK); etc.

Base station 2105 also includes a processor 2135 configured to confer, at least in part, functionality to substantially any electronic component in base station 2105. In particular, processor 2135 can facilitate configuration of base station 2105 via handover component 210, and one or more components therein. Additionally, base station 2105 includes display interface 2112, which can display functions that control functionality of base station 2105, or reveal operation conditions thereof. In addition, display interface 2112 can include a screen to convey information to an end user. In an aspect, display interface 2112 can be a liquid crystal display (LCD), a plasma panel, a monolithic thin-film based electrochromic display, and so on. Moreover, display interface can also include a component (e.g., speaker) that facilitates communication of aural indicia, which can also be employed in connection with messages that convey operational instructions to an end user. Display interface 2112 also facilitates data entry e.g., through a linked keypad or via touch gestures, which can cause base station 2105 to receive external commands, e.g., restart operation.

Broadband network interface 2114 facilitates connection of base station 2105 to a service provider network (e.g., 255, 455, 555) (not shown in FIG. 21) via backhaul link(s) (e.g., 251, 451, 551) (not shown in FIG. 21), which enable incoming and outgoing data flow. Broadband network interface 2114 can be internal or external to base station 2105, and can utilize display interface 2112 for end-user interaction and status information delivery.

Processor 2135 is functionally connected to communication platform 2115 and can facilitate operations on data, e.g., symbols, bits, or chips, for multiplexing/demultiplexing, such as effecting direct and inverse fast Fourier transforms, selection of modulation rates, selection of data packet formats, inter-packet times, etc. Moreover, processor 2135 is functionally connected, via data, system, or address bus 2111, to display interface 2112 and broadband network interface 2114, to confer, at least in part, functionality to each of such components.

In base station 2105, memory 2145 can retain location and/or macro sector identifier(s); access list(s) that authorize access to wireless coverage through base station 2105; sector intelligence that includes ranking of macro sectors in the macro wireless environment of base station 2105, radio link quality and strength associated therewith, or the like. Memory 2145 also can store data structures, code instructions and program modules, system or device information, code sequences for scrambling, spreading and pilot transmission, base station configuration, and so on. Processor 2135 is coupled, e.g., via a memory bus, to memory 2145 in order to store and retrieve information used to operate and/or confer functionality to the components, platform, and interface that reside within base station 2105.

With respect to FIG. 22, wireless communication environment 2200 includes system 600 and macro network platform 2210, which serves or facilitates communication with mobile device 2295 via radio network 2290. It should be appreciated that in cellular wireless technologies (e.g., 3GPP UMTS, HSPA, 3GPP LTE, 3GPP2 UMB), macro network platform 2210 is embodied in a core network. It is noted that radio network 2290 can include base station(s), base transceiver station(s), or access point(s), and associated electronic circuitry and deployment site(s), in addition to a wireless radio link operated in accordance with the base station(s). Accordingly, radio network 2290 can comprise various coverage cells like cell 205. In addition, it should be appreciated that although system 600 is illustrated in FIG. 22 as an entity distinct from other entities, elements, and/or components of wireless communication environment 2200, system 600, and/or elements/components thereof, can be located/included within one or more components/elements, e.g., hardware, software, etc., of wireless communication environment 2200, e.g., macro network platform 2210, radio network 2290, and/or mobile device 2295. Further, it should be appreciated that other embodiments of systems described herein, e.g., system 1100, system 1200, can be included within one or more components/elements of wireless communication environment 2200.

Generally, macro platform 2210 includes components, e.g., nodes, gateways, interfaces, servers, or platforms that facilitate both packet-switched (PS), e.g., internet protocol (IP), frame relay, asynchronous transfer mode (ATM), and circuit-switched (CS) traffic, e.g., voice and data, and control generation for networked wireless communication. In an aspect of the subject innovation, macro network platform 2210 includes CS gateway node(s) 2212 which can interface CS traffic received from legacy networks like telephony network(s) 2240, e.g., public switched telephone network (PSTN), or public land mobile network (PLMN), or a SS7 network 2260. Circuit switched gateway 2212 can authorize and authenticate traffic, e.g., voice, arising from such networks. Additionally, CS gateway 2212 can access mobility or roaming data generated through SS7 network 2260; for instance, mobility data stored in a VLR, which can reside in memory 2230. Moreover, CS gateway node(s) 2212 interfaces CS-based traffic and signaling and gateway node(s) 2218. As an example, in a 3GPP UMTS network, PS gateway node(s) 2218 can be embodied in gateway GPRS support node(s) (GGSN).

In addition to receiving and processing CS-switched traffic and signaling, PS gateway node(s) 2218 can authorize and authenticate PS-based data sessions with served, e.g., through macro RAN, wireless devices. Data sessions can include traffic exchange with networks external to the macro network platform 2210, like wide area network(s) (WANs) 2250; enterprise networks (NWs) 2270, e.g., enhanced 911, or service NW(s) 2280 like IP multimedia subsystem (IMS). It should be appreciated that local area network(s) (LANs), which may be a part of enterprise NW(s), can also be interfaced with macro network platform 2210 through PS gateway node(s) 2218. Packet-switched gateway node(s) 2218 generates packet data contexts when a data session is established. To that end, in an aspect, PS gateway node(s) 2218 can include a tunnel interface, e.g., tunnel termination gateway (TTG) in 3GPP UMTS network(s) (not shown), which can facilitate packetized communication with disparate wireless network(s), such as Wi-Fi networks. It should be further appreciated that the packetized communication can include multiple flows that can be generated through server(s) 2214. It is to be noted that in 3GPP UMTS network(s), PS gateway node(s) 2218 (e.g., GGSN) and tunnel interface (e.g., TTG) comprise a packet data gateway (PDG).

Macro network platform 2210 also includes serving node(s) 2216 that can convey the various packetized flows of information, or data streams, received through PS gateway node(s) 2218. As an example, in a 3GPP UMTS network, serving node(s) can be embodied in serving GPRS support node(s) (SGSN).

As indicated above, server(s) 2214 in macro network platform 2210 can execute numerous applications, e.g., location services, online gaming, wireless banking, wireless device management, etc. that can generate multiple disparate packetized data streams or flows; and can manage such flows, e.g., schedule, queue, format. Such application(s), for example can include add-on features to standard services provided by macro network platform 2210. Data streams can be conveyed to PS gateway node(s) 2218 for authorization/authentication and initiation of a data session, and to serving node(s) 2216 for communication thereafter. Server(s) 2214 can also effect security, e.g., implement one or more firewalls, of macro network platform 2210 to ensure network's operation and data integrity in addition to authorization and authentication procedures that CS gateway node(s) 2212 and PS gateway node(s) 2218 can enact. Moreover, server(s) 2214 can provision services from external network(s), e.g., WAN 2250, or Global Positioning System (GPS) network(s), which can be a part of enterprise NW(s) 2280. It is to be noted that server(s) 2214 can include one or more processors configured to confer at least in part the functionality of macro network platform 2210. To that end, the one or more processors can execute code instructions stored in memory 2230, for example.

In example wireless environment 2200, memory 2230 stores information related to operation of macro network platform 2210. Information can include business data associated with subscribers; market plans and strategies, e.g., promotional campaigns, business partnerships; operational data for mobile devices served through macro network platform; service and privacy policies; end-user service logs for law enforcement; and so forth. Memory 2230 can also store information from at least one of telephony network(s) 2240, WAN 2250, SS7 network 2260, enterprise NW(s) 2270, or service NW(s) 2280.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions and/or processes described herein. Processors can exploit nano-scale architectures such as, but not limited to, molecular and quantum-dot based transistors, switches and gates, in order to optimize space usage or enhance performance of mobile devices. A processor may also be implemented as a combination of computing processing units.

In the subject specification, terms such as "store," "data store," "data storage," "database," and substantially any other information storage component relevant to operation and functionality of a component and/or process, refer to "memory components," or entities embodied in a "memory," or components comprising the memory. It will be appreciated that the memory components described herein can be either volatile memory or nonvolatile memory, or can include both volatile and nonvolatile memory.

By way of illustration, and not limitation, nonvolatile memory, for example, can be included in memory 2145, memory 2230 (see below), non-volatile memory 2322 (see below), disk storage 2324 (see below), memory storage 2346 (see below), client data store(s) 2440 (see below), and server data store(s) 2450 (see below). Further, nonvolatile memory can be included in read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Figure 23:
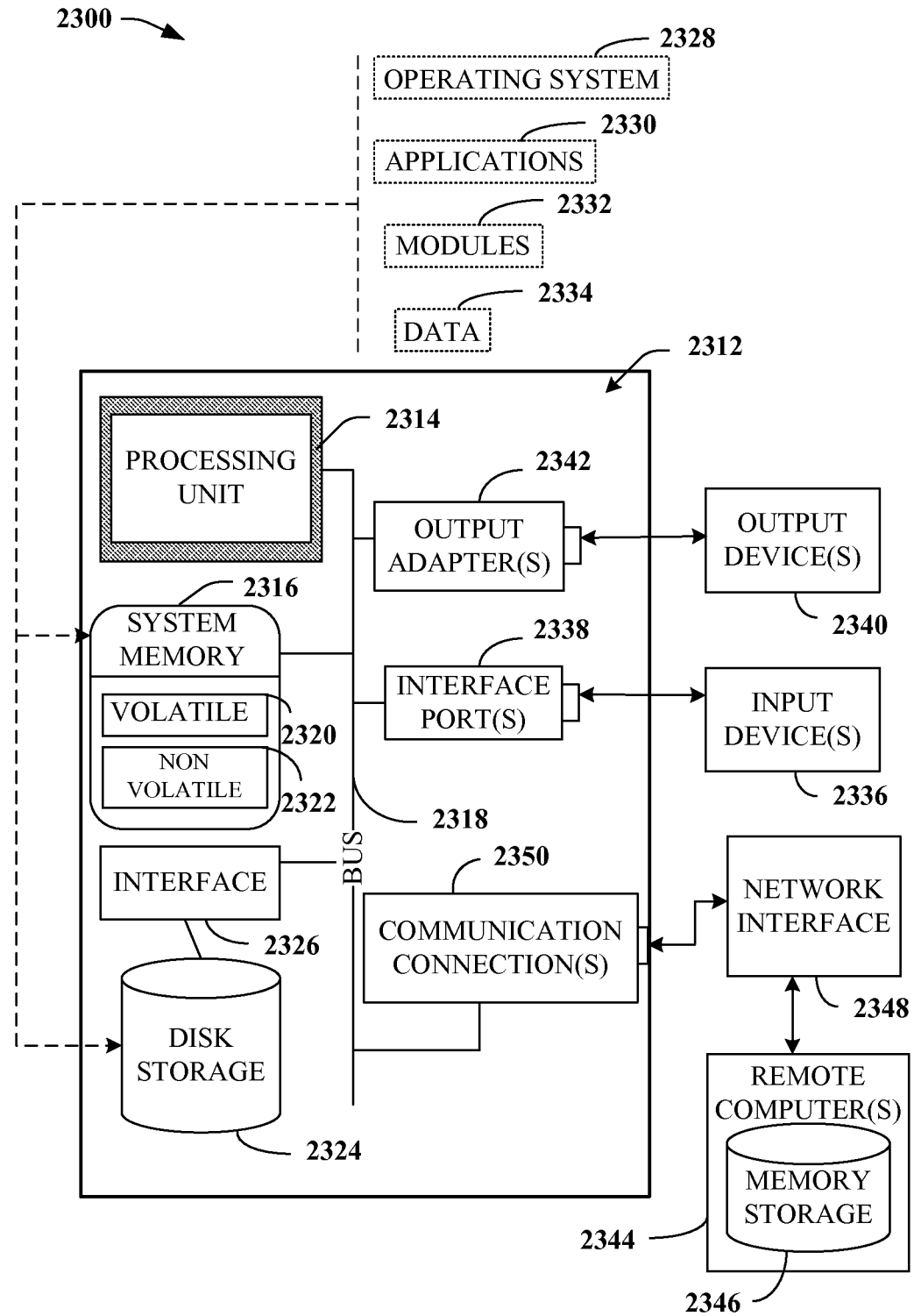
FIG. 23 illustrates a block diagram of a computer operable to execute the disclosed methods and apparatus, in accordance with an embodiment.
Figure 24:
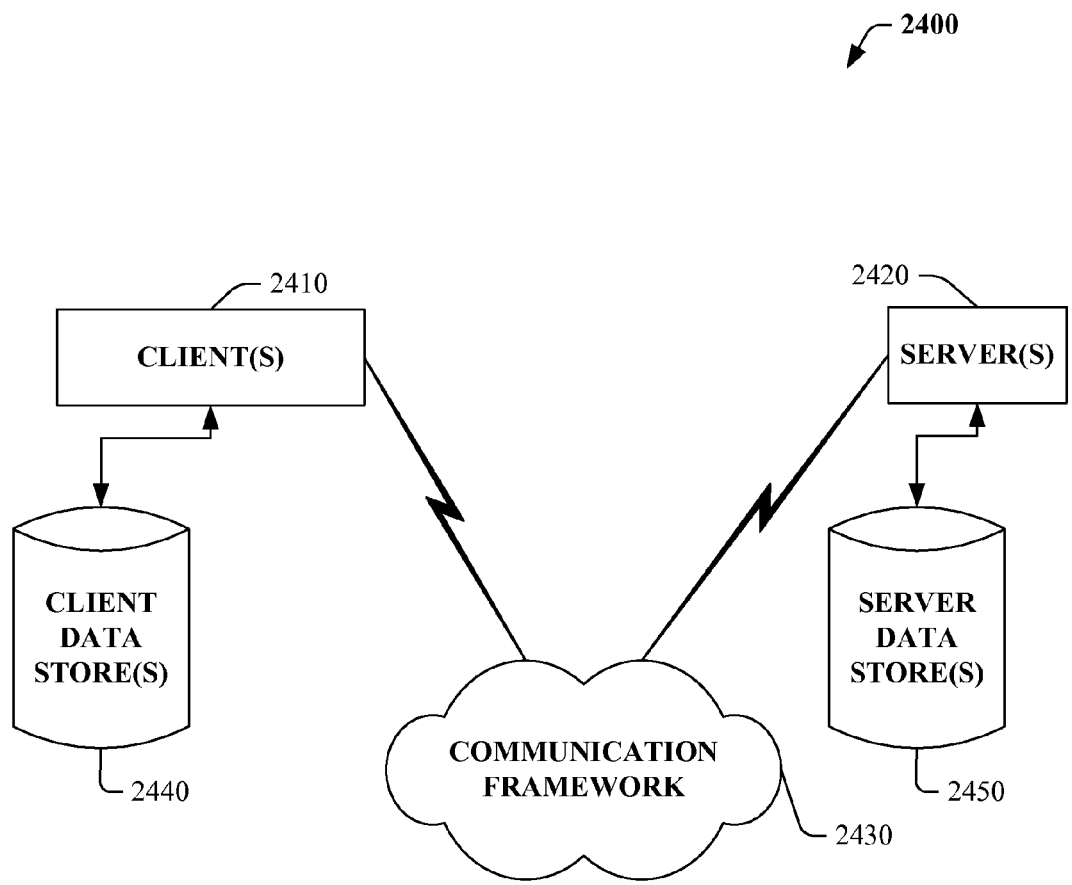
FIG. 24 illustrates a schematic block diagram of an exemplary computing environment, in accordance with an embodiment.

In order to provide a context for the various aspects of the disclosed subject matter, FIGS. 23 and 24, as well as the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the subject innovation also can be implemented in combination with other program modules. Generally, program modules include routines, programs, components, data structures, etc. that perform particular tasks and/or implement particular abstract data types.

Moreover, those skilled in the art will appreciate that the inventive systems can be practiced with other computer system configurations, including single-processor or multiprocessor computer systems, mini-computing devices, mainframe computers, as well as personal computers, hand-held computing devices (e.g., PDA, phone, watch), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

With reference to FIG. 23, a block diagram of a computer 2300 operable to execute the disclosed systems and methods, in accordance with an embodiment, includes a computer 2312. Computer 2312 includes a processing unit 2314, a system memory 2316, and a system bus 2318. System bus 2318 couples system components including, but not limited to, system memory 2316 to processing unit 2314. Processing unit 2314 can be any of various available processors. Dual microprocessors and other multiprocessor architectures also can be employed as processing unit 2314.

System bus 2318 can be any of several types of bus structure(s) including a memory bus or a memory controller, a peripheral bus or an external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1194), and Small Computer Systems Interface (SCSI).

System memory 2316 includes volatile memory 2320 and nonvolatile memory 2322. A basic input/output system (BIOS), containing routines to transfer information between elements within computer 2312, such as during start-up, can be stored in nonvolatile memory 2322. By way of illustration, and not limitation, nonvolatile memory 2322 can include ROM, PROM, EPROM, EEPROM, or flash memory. Volatile memory 2320 includes RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 2312 also includes removable/non-removable, volatile/non-volatile computer storage media. FIG. 23 illustrates, for example, disk storage 2324. Disk storage 2324 includes, but is not limited to, devices like a magnetic disk drive, floppy disk drive, tape drive, Jaz drive, Zip drive, LS-100 drive, flash memory card, or memory stick. In addition, disk storage 2324 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 2324 to system bus 2318, a removable or non-removable interface is typically used, such as interface 2326.

It is to be appreciated that FIG. 23 describes software that acts as an intermediary between users and computer resources described in suitable operating environment 2300. Such software includes an operating system 2328. Operating system 2328, which can be stored on disk storage 2324, acts to control and allocate resources of computer system 2312. System applications 2330 take advantage of the management of resources by operating system 2328 through program modules 2332 and program data 2334 stored either in system memory 2316 or on disk storage 2324. It is to be appreciated that the disclosed subject matter can be implemented with various operating systems or combinations of operating systems.

A user can enter commands or information into computer 2311 through input device(s) 2336. Input devices 2336 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to processing unit 2314 through system bus 2318 via interface port(s) 2338. Interface port(s) 2338 include, for example, a serial port, a parallel port, a game port, and a universal serial bus (USB). Output device(s) 2340 use some of the same type of ports as input device(s) 2336.

Thus, for example, a USB port can be used to provide input to computer 2312 and to output information from computer 2312 to an output device 2340. Output adapter 2342 is provided to illustrate that there are some output devices 2340 like monitors, speakers, and printers, among other output devices 2340, which use special adapters. Output adapters 2342 include, by way of illustration and not limitation, video and sound cards that provide means of connection between output device 2340 and system bus 2318. It should be noted that other devices and/or systems of devices provide both input and output capabilities such as remote computer(s) 2344.

Computer 2312 can operate in a networked environment using logical connections to one or more remote computers, such as remote computer(s) 2344. Remote computer(s) 2344 can be a personal computer, a server, a router, a network PC, a workstation, a microprocessor based appliance, a peer device, or other common network node and the like, and typically includes many or all of the elements described relative to computer 2312.

For purposes of brevity, only a memory storage device 2346 is illustrated with remote computer(s) 2344. Remote computer(s) 2344 is logically connected to computer 2312 through a network interface 2348 and then physically connected via communication connection 2350. Network interface 2348 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 2350 refer(s) to hardware/software employed to connect network interface 2348 to bus 2318. While communication connection 2350 is shown for illustrative clarity inside computer 2312, it can also be external to computer 2312. The hardware/software for connection to network interface 2348 can include, for example, internal and external technologies such as modems, including regular telephone grade modems, cable modems and DSL modems, ISDN adapters, and Ethernet cards.

FIG. 24 illustrates a schematic block diagram of an exemplary computing environment 2430, in accordance with an embodiment. System 2400 includes one or more client(s) 2410. Client(s) 2410 can be hardware and/or software, e.g., threads, processes, computing devices. System 2400 also includes one or more server(s) 2420. Thus, system 2400 can correspond to a two-tier client server model or a multi-tier model, e.g., client, middle tier server, data server, among other models. Server(s) 2420 can also be hardware and/or software, e.g., threads, processes, computing devices. Servers 2420 can include threads to perform transformations by employing the subject innovation, for example. One possible communication between a client 2410 and a server 2420 can be in the form of a data packet transmitted between two or more computer processes.

System 2400 includes a communication framework 2430 that can be employed to facilitate communications between client(s) 2410 and server(s) 2420. Client(s) 2410 are operatively connected to one or more client data store(s) 2440 that can be employed to store information local to client(s) 2410. Similarly, server(s) 2420 are operatively connected to one or more server data store(s) 2450 that can be employed to store information local to servers 2420.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A system, comprising:
   a memory to store instructions; and
   a processor, coupled to the memory, that facilitates execution of the instructions to perform operations, comprising:
   receiving a multimedia messaging service message comprising text;
   determining whether the multimedia messaging service message is a group message directed to addressees;
   in response to determining that the multimedia messaging service message is the group message, determining whether the group message is directed to an addressee of the addressees based on a code of a defined length;
   in response to determining that the group message is directed to the addressee based on the code of the defined length, determining whether the group message is a text-only message;
   in response to determining that the group message is the text-only message, converting the group message to a first short message service message based on the text; and
   sending, based on a short message service protocol using the code, the first short message service message directed to a device associated with the addressee.

2. The system of claim 1, wherein the operations further comprise:
   receiving a second short message service message; and
   sending the second short message service message directed to another device based on a telephone number of a different length than the defined length.

3. The system of claim 1, wherein the operations further comprise:
   sending another multimedia messaging service message directed to another device based on a telephone number of a different length than the defined length and associated with another addressee.

4. The system of claim 1, wherein the operations further comprise:
   sending the multimedia messaging service message directed to another device based on a telephone number of a different length than the defined length.

5. The system of claim 1, wherein the operations further comprise:
   in response to determining that another multimedia messaging service message is the group message and comprises the multimedia content, sending the other multimedia messaging service message directed to another device based on a telephone number corresponding to one of the addressees.

6. The system of claim 1, wherein the operations further comprise:
   in response to determining that the code does not conform to North American numbering plan administration guidelines related to a mobile station integrated services digital network number, identifying whether the addressees are associated with the code.

7. The system of claim 1, wherein the operations further comprise:
   in response to determining that one of the addressees is associated with a telephone number, sending the first short message service message directed to another device based on the telephone number.

8. The system of claim 1, wherein the operations further comprise:
   in response to determining that the addressees are associated with a telephone number, sending another multimedia messaging service message directed to devices associated with the addressees via a multimedia messaging service protocol.

9. The system of claim 1, wherein the operations further comprise:
in response to determining that the code is a non-international number that is less than ten digits long, identifying whether the addressees are associated with the code.

10. The system of claim 1, wherein the operations further comprise:
in response to determining that the code is a non-international eleven-digit number, identifying whether the addressees are associated with the code.

11. A method, comprising:
receiving, by a system comprising a processor, a multimedia messaging service message comprising text;
in response to determining that the multimedia messaging service message is a group message directed to addressees, and in response to determining that the multimedia messaging service message is directed to an addressee of the addressees based on a code of a defined length, determining, by the system, whether the multimedia messaging service message is a text-only message;
in response to the multimedia messaging service message being determined to be the text-only message, generating, by the system based on the text, a short message service message; and
sending, by the system based on the code via a short message service protocol, the short message service message directed to a device associated with the addressee.

12. The method of claim 11, further comprising:
receiving, by the system, another multimedia messaging service message associated with another addressee; and
sending, by the system, the other multimedia messaging service message directed to another device based on a North American numbering plan administration phone number associated with the other addressee.

13. The method of claim 11, wherein the sending comprises sending the multimedia messaging service message directed to the device based on a North American numbering plan administration phone number associated with the addressee in response to the addressee being determined to be associated with the code and in response to the multimedia messaging service message being determined not to comprise the multimedia content.

14. The method of claim 11, wherein the sending comprises sending the multimedia messaging service message directed to the device based on a North American numbering plan administration phone number associated with the addressee in response to the multimedia messaging service message being determined to comprise the multimedia content.

15. The method of claim 11, further comprising:
receiving, by the system, another short message service message; and
sending, by the system, the other short message service message directed to another device based on another code different than the code.

16. The method of claim 11, further comprising:
determining, by the system, whether the group message is directed to the device using a non-international ten-digit number that does not conform to North American numbering plan administration guidelines related to a mobile station integrated services digital network number.

17. The method of claim 11, further comprising:
in response to the group message being determined to be directed to the device based on a North American numbering plan administration phone number and the code, directing, by the system, a request to a wireless communications device for approval to send the short message service message directed to the addressees via a short message service protocol.

18. A computer-readable storage device comprising computer executable instructions that, in response to execution, cause a computing system comprising a processor to perform operations, comprising:
receiving a multimedia messaging service group-based message comprising text being directed to addressees;
determining whether the grouped-based message is directed to an addressee of the addressees based on an identifier of a defined length;
in response to determining that the group-based message is directed to the addressee based on the identifier of the defined length, determining whether the multimedia messaging service group-based message is a text-only message;
in response to determining that the multimedia messaging service group-based message is the text-only message, converting the multimedia messaging service group-based message to a short message service message comprising the text; and
sending the short message service message directed to a first device associated with the addressee based on a short message service protocol using the identifier of the defined length.

19. The computer-readable storage device of claim 18, wherein the operations further comprise:
receiving another short message service message; and
sending the other short message service message directed to a second device based on another identifier of the defined length.

20. The computer-readable storage medium of claim 18, wherein the operations further comprise:
in response to the multimedia messaging service message being determined to comprise multimedia content, sending the multimedia messaging service message directed to a second device based on a North American numbering plan administration phone number associated with the identifiers.

* * * * *